US008645439B2

(12) United States Patent
Kinsman et al.

(10) Patent No.: US 8,645,439 B2
(45) Date of Patent: Feb. 4, 2014

(54) BIT-WIDTH ALLOCATION FOR SCIENTIFIC COMPUTATIONS

(75) Inventors: Adam Bruce Kinsman, Brantford (CA); Nicola Nicolici, Mississauga (CA)

(73) Assignee: McMaster University, Hamilton, Ontario (CA)

( * ) Notice: Subject to any disclaimer, the term of this patent is extended or adjusted under 35 U.S.C. 154(b) by 611 days.

(21) Appl. No.: 12/897,652

(22) Filed: Oct. 4, 2010

(65) Prior Publication Data

US 2012/0023149 A1 Jan. 26, 2012

Related U.S. Application Data

(60) Provisional application No. 61/290,067, filed on Dec. 24, 2009.

(51) Int. Cl.
*G06F 7/00* (2006.01)
(52) U.S. Cl.
USPC ........................................................ 708/204
(58) Field of Classification Search
USPC ........................................................ 708/204
See application file for complete search history.

(56) References Cited

U.S. PATENT DOCUMENTS

| 6,970,577 | B2 | 11/2005 | Han | |
| 7,080,228 | B2 * | 7/2006 | Huras et al. | 711/170 |
| 2002/0071393 | A1 * | 6/2002 | Musoll | 370/248 |

OTHER PUBLICATIONS

A. Kinsman and N. Nicolici, "Computational bit-width allocation for operations in vector calculus", Proc. IEEE International Conference on COmputer Design (ICCD), pp. 433-438, 2009.

A. Kinsman and N. Nicolici, "Finite precision bit-width allocation using SAT-modulo theory", Proc. IEEE/ACM Design, Automation and Test in Europe (DATE), pp. 1106-1111, 2009.
P. Belanovic and M. Rupp, "Automated Floating-point to Fixed-point Conversion with the Fixify Environment", Proc. International Workshop on Rapid System Prototyping, pp. 172-178, 2005.
R. Burden and J. Faires, "Numerical Analysis", 7th ed., Brooks Cole, 2000, p. 94.
C. Fang et al., "Fast, Accurate Static Analysis for Fixed-point Finite-precision Effects in DSP Designs", Proc. International Conference on Computer Aided Design (ICCAD), pp. 275-282, 2003.
M. Franzle and C. Herde, "HySAT: An Efficient Proof Engine for Bounded Model Checking of Hybrid Systems", Formal Methods in System Design, 30(3), pp. 178-198, Jun. 2007.
A. Gaffar et al., "Floating-point Bitwidth Analysis via Automatic Differentiation", Proc. IEEE International Conference on Field-Programmable Technology (FPT), pp. 158-165, 2002.
A Gaffar et al. "Unifying Bit-width Optimisation for Fixed-point and Floating-point Designs", Proc. IEEE Symposium on Field-Programmable Custom Computing Machines (FCCM), pp. 79-88, 2004.
D. Goldberg, "What every computer scientist should know about floating point arithmetic", ACM Computing Surveys, 23(1), pp. 5-48, 1991.
G. Golub and C. Loan, "Matrix Computations", 3d ed., John Hopkins University Press, 1996, p. 23-34.

(Continued)

*Primary Examiner* — Tan V. Mai
(74) *Attorney, Agent, or Firm* — Brion Raffoul

(57) ABSTRACT

Methods and devices for automatically determining a suitable bit-width for data types to be used in computer resource intensive computations. Methods for range refinement for intermediate variables and for determining suitable bit-widths for data to be used in vector operations are also presented. The invention may be applied to various computing devices such as CPUs (Central Processing Units), GPUs (Graphic Processing Units), FPGAs (Field Programmable Gate Arrays), etc.

5 Claims, 17 Drawing Sheets

(56) References Cited

OTHER PUBLICATIONS

IEEE, "IEEE Standard for Floating-Point Arithmetic", IEEE Std. 754-2008, pp. 1-58, 2008.

J. Cong et al., "Evaluation of Static Analysis Techniques for Fixed-Point Precision Optimization", Proc. International Symposium on Field-Programmable Custom Computing Machines, pp. 231-234, 2009.

A. Kinsman and N. Nicolici, "Bit-width allocation for hardware accelerators for scientific computing using SAT-modulo theory", IEEE Transactions on Computer-Aided Design of Integrated Circuits and Systems, 29(3), pp. 405-413, 2010.

D. Lee et al., "Accuracy-Guaranteed Bit-width Optimization", IEEE Transactions on Computer-Aided Design, 25(10), pp. 1990-2000, 2006.

J. Lopez et al., "Improved Interval-Based Characterization of Fixed-Point LTI Systems with Feedback Loops", IEEE Transactions on Computer Aided Design, 26(11), pp. 1923-1933, 2007.

R. Mafi et al., "Hardware-based Parallel Computing for Real-time Haptic Rendering of Deformable Objects", Proc. of the IEEE International Conference on Intelligent Robots and Systems (IROS), p. 4187, 2008.

A. Mallik et al., "Low-Power Optimization by Smart Bit-Width Allocation in a SystemC-Based ASIC Design Environment", IEEE Transactions on Computer-Aided Design, pp. 447-455, Mar. 2007.

W. Osborne et al., "Automatic Accuracy-Guaranteed Bit-Width Optimization for Fixed and Floating-Point Systems", Proc. International Conference on Field Programmable Logic and Applications (FPL), pp. 617-620, 2007.

K. Radecka and Z. Zilic, "Arithmetic transforms for compositions of sequential and imprecise datapaths", IEEE Transactions on Computer-Aided Design of Integrated Circuits and Systems, 25(7), pp. 1382-1391, Jul. 2006.

K. Sano et al., "Systolic Architecture for Computational Fluid Dynamics on FPGAs", Proc. International Symposium on Field-Programmable Custom Computing Machines, pp. 107-116, 2007.

R. Scrofano et al., "Accelerating Molecular Dynamics Simulations with Reconfigurable Computers", IEEE Transactions on Parallel and Distributed Systems, 19(6), pp. 764-778, Jun. 2008.

C. Shi and R. Brodersen, "An Automated Floating-point to Fixed-point Conversion Methodology", Proc. International Conference on Acoustics, Speech, and Signal Processing (ICASSP), pp. 529-532, 2003.

J. Stolfi and L. De Figueiredo, "Self-Validated Numerical Methods and Applications", Brazilian Mathematics Colloquium Monograph, 1997, p. 1-116.

T. Todman et al, "Reconfigurable Computing: Architectures and Design Methods", IEEE Proceedings—Computers and Digital Techniques, pp. 193-207, Mar. 2005.

University of Oldenburg, "HySAT Quick Start Guide", online: <http://hysat.informatik.uni-oldenburg.de/26273.html>.

* cited by examiner

| Var. | Empirical Simulation | | Formal | | | |
|---|---|---|---|---|---|---|
| | | | Affine | | Proposed | |
| | Range | Bits | Range | Bits | Range | Bits |
| $c_1$ | [-3.7e4, 3.7e4] | 17 | [-4e4, 4e4] | 17 | [-4e4, 4e4] | 17 |
| $c_2$ | [1, 1.4e5] | 18 | [-8e4, 1.6e5] | 18 | [0, 1.6e5] | 18 |
| $z$ | [0, 1e4] | 14 | $\infty$ | — | [-864, 4e4] | 16 |

FIGURE 4

Input: CalculationSteps, InputVarList, InputVarRanges, IntermediateVarList
Output: IntermediateVarRanges 1  Use CalculationSteps to set up base SMT formulation;
2  foreach *var in IntermediateVarList* do
3    Refine range of *var* (Figure 3);
4    update IntermediateVarRanges for *var*;
5    update base SMT formulation with range of *var*;
   end
6  RETURN IntermediateVarRanges;

FIGURE 6

| Name | Vector Operation | Magnitude Model |
|---|---|---|
| Dot Product | $\mathbf{x} \cdot \mathbf{y}$ | $\|\mathbf{x}\|\|\mathbf{y}\|\cos(\theta_{xy})$ |
| Addition | $\mathbf{x}+\mathbf{y}$ | $\sqrt{\|\mathbf{x}\|^2 + \|\mathbf{y}\|^2 + 2\mathbf{x}\cdot\mathbf{y}}$ |
| Subtraction | $\mathbf{x}-\mathbf{y}$ | $\sqrt{\|\mathbf{x}\|^2 + \|\mathbf{y}\|^2 - 2\mathbf{x}\cdot\mathbf{y}}$ |
| Matrix Multiplication | $A\mathbf{x}$ | $\sigma\|\mathbf{x}\|$ $\|\sigma_A^{min}\| \leq \sigma \leq \|\sigma_A^{max}\|$ |
| Pointwise Product | $\mathbf{x} \circ \mathbf{y}$ | $\varepsilon\|\mathbf{x}\|\|\mathbf{y}\|$ $0 \leq \varepsilon \leq 1$ |

FIGURE 7

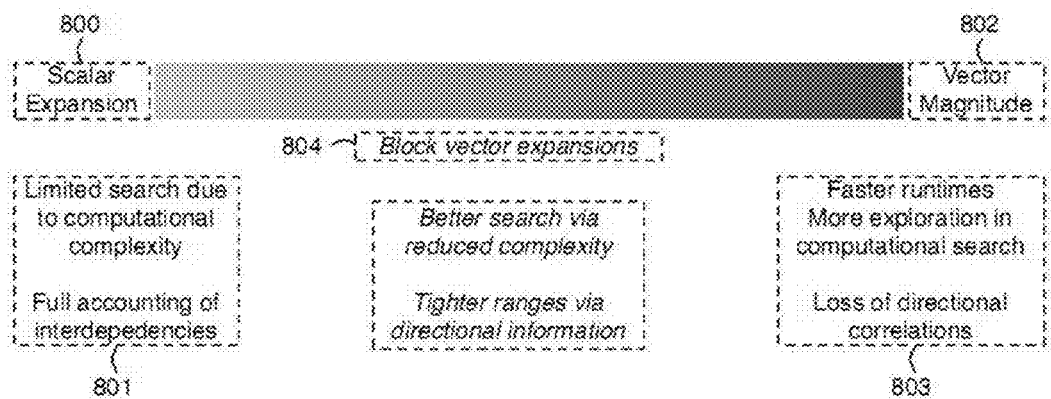

FIGURE 8

Input: VectorCalculation, InputVariables, InputRanges, IntermediateVariables, SizeThresh, GainThresh
Output: IntermediateMagnitudes 1  Model = VectorMagnitudeModel(VectorCalculation, InputVariables, InputRanges, IntermediateVariables);
2  UpdatedMagnitudes=DetermineRanges(Model);
3  Flag = True;
4  while *Flag* do
5     Model = Partition(Model);
6     IntermediateMagnitudes = UpdatedMagnitudes;
7     UpdatedMagnitudes = DetermineRanges(Model);
8     Gain=max( UpdatedMagnitudes / IntermediateMagnitudes );
9     if *Gain < GainThresh* then
      Flag = False;
   end
10   if *size(Model) > SizeThresh* then
      Flag = False;
   end
end
11 RETURN IntermediateMagnitudes;

FIGURE 10

| Operator | Infinite Precision (Expression) | Finite Precision (Constraint) |
|---|---|---|
| Addition | $z = x + y$ | $\Delta z = \Delta x + \Delta y + \delta z$ |
| Subtraction | $z = x - y$ | $\Delta z = \Delta x - \Delta y + \delta z$ |
| Multiplication | $z = xy$ | $\Delta z = x\Delta y + y\Delta x + \Delta x \Delta y + \delta z$ |
| Division | $z = x/y$ | $\Delta z = \frac{\Delta x - z\Delta y}{y + \Delta y} + \delta z$ |
| Square root | $z = \sqrt{x}$ | $(\Delta z)^2 + 2z(z - \delta z)\Delta z = \Delta x - (\delta z)^2 + 2z\delta z$ |
| Vector inner product | $z = x^T y$ | $\Delta z = x^T(\Delta y) + (\Delta x)^T y + (\Delta x)^T(\Delta y) + \delta z$ |
| Matrix-vector product | $z = Ax$ | $\Delta z = A(\Delta x) + (\Delta A)x + (\Delta A)(\Delta x) + \delta z$ |

FIGURE 12

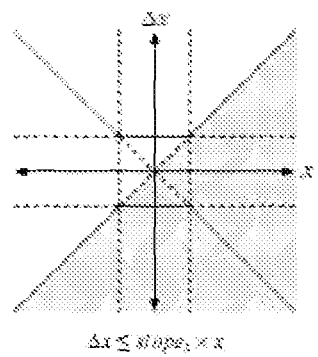
(a) C1 : $\Delta x \leq slope_x \times x$.
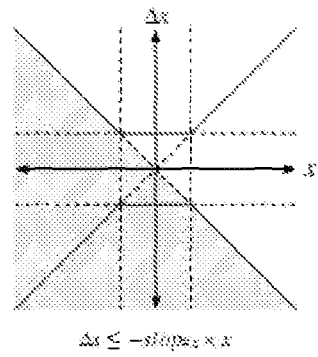
(b) C2 : $\Delta x \leq -slope_x \times x$.
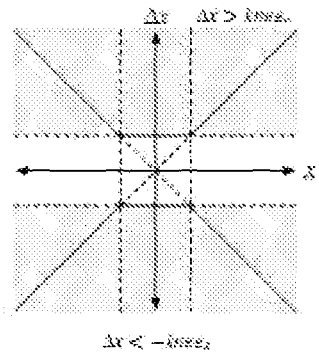
(c) C3 : $\Delta x > knee_x$, C4 : $\Delta x < -knee_x$.
FIGURE 14

| Type | Constraints | Bits Required | Total |
|---|---|---|---|
| Fixed | $x_L < x < x_H$<br>$\delta x_L < \delta x < \delta x_H$ | $I = \lceil log_2 \max(\lvert x_L \rvert, \lvert x_H \rvert) + 1 \rceil$<br>$F = -\lfloor log_2 \min(\lvert \delta x_L \rvert, \lvert \delta x_H \rvert) \rfloor$ | $s + I + F$ |
| Float | $x_L < \bar{x} < x_H$<br>$\delta x \leq \max\left(\dfrac{slope_x \lvert x \rvert}{knee_x}\right)$ | $M = -\lfloor log_2(slope_x) \rfloor$<br>$E_H = \lceil log_2(\max(\lvert x_L \rvert, \lvert x_H \rvert)) \rceil$<br>$E_L = \lfloor log_2 knee_x \rfloor + M - 1$<br>$E = \lceil log_2(E_H - E_L + 1) \rceil$ | $s + M + E$ |

FIGURE 19

BIT-WIDTH ALLOCATION FOR SCIENTIFIC COMPUTATIONS

RELATED APPLICATIONS

This application claims priority on U.S. Patent application Ser. No. 61/290,067 filed Dec. 24, 2009 which hereby incorporated reference.

TECHNICAL FIELD

The present invention relates to machine computations. More specifically, the present invention relates to methods, systems, and devices relating to the determination and validation of bit-widths for data structures and arithmetic units to be used in machine assisted scientific computations (e.g. as performed using multicore CPUs (Central Processing Units), GPUs (Graphics Processing Units and FPGAs (Field Programmable Gate Arrays).

BACKGROUND OF THE INVENTION

Scientific research has come to rely heavily on the use of computationally intensive numerical computations. In order to take full advantage of the parallelism offered by the custom hardware-based computing systems, the size of each individual arithmetic engine should be minimized. However, floating-point implementations (as most scientific software applications use) have a high hardware cost, which severely limits the parallelism and thus the performance of a hardware accelerator. For legacy scientific software, the use of high precision is motivated more out of the availability of the hardware in the existing microprocessors rather than the need for such high precision. For this reason, a reduced precision floating-point or fixed-point calculation will often suffice. At the same time, many scientific calculations rely on iterative methods, and convergence of such methods may suffer if precision is reduced. Specifically, a reduction in precision, which enables increased parallelism, would be worthwhile so long as the time to converge does not increase to the point that the overall computational throughput is reduced. In light of the above, a key factor in the success of a hardware accelerator is reaching the optimal trade-off between error, calculation time and hardware cost.

Approximation of real numbers with infinite range and precision by a finite set of numbers in a digital computer gives rise to approximation error which is managed in two fundamental ways. This leads to two fundamental representations: floating-point and fixed-point which limit (over their range) the relative and absolute approximation error respectively. The suitability of limited relative error in practice, which also enables representation of a much larger dynamic range of values than fixed-point of the same bit-width, makes floating-point a favorable choice for many numerical applications. Because of this, double precision floating-point arithmetic units have for a long time been included in general purpose computers, biasing software implementations toward this format. This feedback loop between floating-point applications and dedicated floating-point hardware units has produced a body of almost exclusively floating-point scientific software.

Although transistor scaling and architectural innovation have enabled increased power for the above mentioned general purpose computing platforms, recent advances in field programmable gate arrays (FPGAs) have tightened the performance gap to application specific integrated circuits (ASICs), motivating research into reconfigurable hardware acceleration (see Todman reference for a comprehensive survey of architectures and design methods). These platforms stand to provide greater computational power than general purpose computing, a feat accomplished by tailoring hardware calculation units to the application, and exploiting parallelism by replication in FPGAs.

To leverage the FPGA parallelism, calculation units should use as few resources as possible, standing in contrast to (resource demanding) floating-point implementations used in reference software. As mentioned above however, the use of floating-point in the software results mostly from having access to floating-point hardware rather than out of necessity of a high degree of precision. Thus by moving to a reduced yet sufficient precision floating-point or fixed-point scheme, a more resource efficient implementation can be used leading to increased parallelism and with it higher computational throughput. Therefore, due to its impact on resources and latency, choice of data representation (allocating the bit-width for the intermediate variables) is a key factor in the performance of such accelerators. Hence, developing structured approaches to automatically determine the data representation is becoming a central problem in high-level design automation of hardware accelerators; either during architectural exploration and behavioral synthesis, or as a pre-processing step to register transfer-level (RTL) synthesis. By reducing bit-width, all elements of the data-path will be reduced, most importantly memories, as a single bit saved reduces the cost of every single address. Furthermore, propagation delay of arithmetic units is often tied to bit-width, as well as latency in the case of sequential units (e.g. sequential multiplier or divider).

Given the impact of calculation unit size on performance, a key problem that arises in accelerator design is that of numerical representation. Since instruction processors at the heart of most computing platforms have included hardware support for IEEE 754 single or double precision floating-point operations [see IEEE reference listed at the end of this document] for over a decade, these floating-point data types are often used in applications where they far exceed the real precision requirements just because support is there. While no real gains stand to be made by using custom precision formats on an instruction based platform with floating-point hardware support, calculation units within an accelerator can benefit significantly from reducing the precision from the relatively costly double or single IEEE 754. FIG. 1 depicts the a system which executes a process of performing a calculation within tolerances, where the input to a calculation 100 known to a certain tolerance 101 produces a result 102 also within a tolerance that depends on the precision used to perform the calculation. Under IEEE 754 double precision, implementation of the calculation will have a certain cost 103 and produce a certain tolerance 104. Choosing a custom representation enables the tolerance of the result 105 to be expanded, yet remaining within the tolerance requirements 106, in exchange for a smaller implementation cost 107. Some existing methods for determining custom data representations to leverage these hardware gains are discussed below.

Two main types of numerical representation are in widespread use today: fixed and floating-point. Fixed-point data types consist of an integer and a constant (implied) scale factor, which results in representation of a range of numbers separated by fixed step size and thus bounded absolute error. Floating-point on the other hand consists (in simple terms) of a normalized mantissa (e.g. m with range $1 \leq m < 2$) and an encoded scale factor (e.g. as powers of two) which represents a range of numbers separated by step size dependent on the represented number and thus bounded relative error and larger dynamic range of numbers than fixed point.

Determining custom word sizes for the above mentioned fixed- and floating-point data types is often split into two complementary parts of 1) representation search which decides (based on an implementation cost model and feedback from bounds estimation) how to update a current candidate representation and 2) bounds estimation which evaluates the range and precision implications of a given representation choice in the design. An understanding about bounds on both the range and precision of intermediate variables is necessary to reach a conclusion about the quantization performance of a chosen representation scheme, and both aspects of the problem have received attention in the literature.

Bounds estimation for an intermediate variable from a calculation itself has two aspects. Bounds on both the range and precision required must be determined, from which can be inferred the required number of exponent and mantissa bits in floating-point, or integer and fraction bits in fixed-point. A large volume of work exists targeted at determining range and/or precision bounds in the context of both digital signal processing (DSP) and embedded systems domains [see Todman reference], yielding two classes of methods: 1) formal based primarily on affine arithmetic [see Stolfi reference and the Lee reference] or interval arithmetic [see Moore reference]; and 2) empirical based on simulation [see Shi reference and Mallik reference], which can be either naive or smart (depending on how the input simulation vectors are generated and used). Differences between these two fundamental approaches are discussed below.

Empirical methods require extensive compute times and produce non-robust bit-widths. They rely on a representative input data set and work by comparing the outcome of simulation of the reduced precision system to that of the "infinite" precision system, "infinite" being approximated by "very high"—e.g. double precision floating-point on a general purpose machine. Approaches including those noted in the Belanovic reference, the Gaffar reference, and the Mallik reference seek to determine the range of intermediate variables by direct simulation while the Shi reference creates a new system related to the difference between the infinite and reduced precision systems, reducing the volume of simulation data which must be applied. Although simulation tends to produce more compact data representations than analytical approaches, often the resultant system is not robust, i.e. situations not covered by the simulation stimuli can lead to overflow conditions resulting in incorrect behavior.

These methods are largely inadequate for scientific computing, due in part to differences between general scientific computing applications and the DSP/embedded systems application domain. Many DSP systems can be characterized very well (in terms of both their input and output) using statistics such as expected input distribution, input correlation, signal to noise ratio, bit error rate, etc. This enables efficient stimuli modelling providing a framework for simulation, especially if error (noise) is already a consideration in the system (as is often the case for DSP). Also, given the real-time nature of many DSP/embedded systems applications, the potential input space may be restricted enough to permit very good coverage during simulation. Contrast these scenarios to general scientific computing where there is often minimal error consideration provided and where stimuli characterization is often not as extensive as for DSP.

FIG. 2 illustrates the differences between simulation based (empirical) 200 and formal 201 methods when applied to analyze a scientific calculation 202. Simulation based methods 200 are characterized by a need for models 203 and stimuli 204, excessive run-times 205 and lack of robustness 206, due to which they cannot be relied upon in scientific computing implementations. In contrast, formal methods 201 depend on the calculation 202 only and provide robust bit-widths 207. An obvious formal approach to the problem is known as range or interval arithmetic (IA) [see Moore reference], which establishes worst-case bounds on each intermediate step of the calculation by establishing worst-case bounds at each step. Expressions can be derived for the elementary operations, and compounded starting from the range of the inputs. However, since dependencies between intermediate variables are not taken into account, the range explosion phenomenon results; the range obtained using IA is much larger than the actual possible range of values causing severe over-allocation of resources.

In order to combat this, affine arithmetic (AA) has arisen which keeps track (linearly) of interdependencies between variables (e.g. see Fang reference, Cong reference, Osborne reference, and Stolfi reference) and non-affine operations are replaced with an affine approximation often including introduction of a new variable (consult the Lopez reference for a summary of approximations used for common non-affine operations). While often much better than IA, AA can still result in an overestimate of an intermediate variable's potential range, particularly when strongly non-affine operations occur as a part of the calculation, a compelling example being division. As the Fang reference points out, this scenario is rare in DSP, accounting in part for the success of AA in DSP however it occurs frequently in scientific calculations.

FIG. 3 summarizes the landscape of techniques that address the bit-width allocation problem. It should be noted that FIG. 3 includes prior art methods as well as methods which fall within the purview of the present invention. Empirical 300 methods require extensive compute times and produce non-robust 301 bit-widths; while formal 302 methods guarantee robustness 303, but can over-allocate resources. Despite the success of the above techniques for a variety of DSP and embedded applications, interest has been mounting in custom acceleration of scientific computing. Examples include: computational fluid dynamics [see Sano reference], molecular dynamics [see Scrofano reference] or finite element modeling [see Mafi reference]. Scientific computing brings unique challenges because, in general, robust bit-widths are required in the scientific domain to guarantee correctness, which eliminates empirical methods. Further, ill-conditioned operations, such as division (common in numerical algorithms), can lead to severe over-allocation and even indeterminacy for the existing formal methods based on interval 304 or affine 305 arithmetic.

Exactly solving the data representation problem is tantamount to solving global optimization in general for which no scalable methods are known. It should be noted that, while relaxation to a convex problem is a common technique for solving some non-convex optimization problems [see Boyd reference], the resulting formulation for some scientific calculations can be extremely ill-conditioned. This leads, once more, to resource over-allocation.

While the above deals primarily with the bounds estimation aspect of the problem, the other key aspect of the bit-width allocation problem is the representation search, which relies on hardware cost models and error models, and has also been addressed in other works (e.g., [see Gaffar reference]). However, existing methods deal with only one of fixed- or floating-point representations for an entire datapath (thus requiring an up-front choice before representation assignment).

It should also be noted that present methods largely do not address iterative calculations. When iterative calculations have been addressed, such measures were primarily for DSP type applications (e.g. see Fang reference]) such as in a small stable infinite impulse response (IIR) filter.

There is therefore a need for novel methods and devices which mitigate if not overcome the shortcomings of the prior art as detailed above.

SUMMARY OF INVENTION

The present invention provides methods and devices for automatically determining a suitable bit-width for data types to be used in computer resource intensive computations. Methods for range refinement for intermediate variables and for determining suitable bit-widths for data to be used in vector operations are also presented. The invention may be applied to various computing devices such as CPUs, GPUs, FPGAs, etc.

In a first aspect, the present invention provides a method for improving and validating memory and arithmetic resource allocation in computing devices when performing computing resource intensive computations, the method comprising:
a) determining a type of computation to be performed;
b) determining variables to be used in said computation;
c) determining constraints for said computation;
d) processing said variables and said constraints to either validate at least one bit-width for said variables or to generate at least one suitable bit-width to be used for said variables, said bit-width being a number of bits to be allocated for said variables;
e) allocating resources for said computation based on said at least one bit-width determined in step d).

Preferably, in the event the computation is a vector computation, step d) comprises
d1) replacing vector operations in the computation with bounding operations which bound vector magnitudes according to a table as follows:

| Name | Vector Operation | Magnitude Model |
|---|---|---|
| Dot Product | x · y | $\|x\|\|y\|\cos(\theta_{xy})$ |
| Addition | x + y | $\sqrt{\|x\|^2 + \|y\|^2 + 2x \cdot y}$ |
| Subtraction | x − y | $\sqrt{\|x\|^2 + \|y\|^2 - 2x \cdot y}$ |
| Matrix Multiplication | Ax | $\sigma\|x\|$ $\|\sigma_A^{min}\| \leq \sigma \leq \|\sigma_A^{max}\|$ |
| Pointwise Product | x ∘ y | $\epsilon\|x\|\|y\|$ $0 \leq \epsilon \leq 1$ | d2) partitioning the bounding operations to obtain first bounded operations
d3) determining numerical bounds for the first bounded operations to obtain first numerical bounds
d4) partitioning the bounded operations in a partitioning manner different from step d2) to obtain second bounded operations
d5) determining numerical bounds for the second bounded operations to obtain second numerical bounds
d6) comparing the first numerical bounds with the second numerical bounds to obtain a numerical bound gain
d7) successively repeating steps d2)-d6) until the numerical bound gain is less than a given threshold or until a size of either the first bounded operations or the second bounded operations exceed a predetermined size threshold
d8) determining a bit-width of the second numerical bounds
d9) determining that the bit-width of the second numerical bounds is one of the at least one suitable bit-width.

Also preferably, in the event the computation requires at least one intermediate variable with a predetermined upper bound value and a predetermined lower bound value, step d) comprises, for each of the at least one intermediate variable,
d1) determining constraints for each variable in the computation
d2) assigning the predetermined upper bound value to a temporary upper bound and assigning the predetermined lower bound value to a temporary lower bound
d3) determining if all of the constraints can be satisfied using said temporary upper bound and the temporary lower bound
d4) in the event the constraints can be satisfied using the temporary upper bound and the temporary lower bound, adjusting the temporary upper bound to a value equal to halfway between the temporary upper bound and the temporary lower bound
d5) in the event the constraints cannot be satisfied using the temporary upper bound and the temporary lower bound, adjusting the temporary lower bound to a value equal to halfway between the temporary upper bound and the temporary lower bound
d6) repeating steps d3)-d5) until an interval between the temporary upper bound and the temporary lower bound is less than a predetermined threshold value
d7) assigning the temporary lower bound to an improved lower bound and assigning the predetermined upper bound to the temporary upper bound
d8) determining if all of the constraints can be satisfied using the temporary upper bound and the temporary lower bound
d9) in the event the constraints can be satisfied using the temporary upper bound and the temporary lower bound, adjusting the temporary lower bound to a value equal to halfway between the temporary upper bound and the temporary lower bound
d10) in the event the constraints cannot be satisfied using the temporary upper bound and the temporary lower bound, adjusting said temporary upper bound to a value equal to halfway between the temporary upper bound and the temporary lower bound
d11) repeating steps d8)-d10) until an interval between the temporary upper bound and the temporary lower bound is less than the predetermined threshold value
d12) assigning the temporary upper bound to an improved upper bound
d13) determining bit-widths of the improved upper bound and the improved lower bound
d14) determining that a larger bit-width of either the improved upper bound or the improved lower bound is one of the at least one suitable bit-width.

In a second aspect, the present invention provides computer readable media having encoded thereon instructions for executing a method for improving and validating memory and arithmetic resource allocation in computing devices when performing computing resource intensive computations, the method comprising:
a) determining a type of computation to be performed;
b) determining variables to be used in said computation;
c) determining constraints for said computation;
d) processing said variables and said constraints to either validate at least one bit-width for said variables or to generate at least one suitable bit-width to be used for said variables, said bit-width being a number of bits to be allocated for said variables;
e) allocating resources for said computation based on said at least one bit-width determined in step d).

BRIEF DESCRIPTION OF THE DRAWINGS

A better understanding of the invention will be obtained by considering the detailed description below, with reference to the following drawings in which:

FIG. 4 is a table showing results from an example described in the Background;

FIG. 6 illustrates pseudo-code for a method according to another aspect of the invention;

FIG. 7 illustrates a table detailing vector operations and magnitude models to replace them with according to another aspect of the invention;

FIG. 8 illustrates a block diagram detailing the goals of block vector representations;

FIG. 10 illustrates pseudo-code for a method according to another aspect of the invention which deals with vector operations;

FIG. 12 is a table detailing various infinite precision expressions and their finite precision constraints according to another aspect of the invention;

FIG. 14*a*-14*c* illustrates different partial error regions and their associated constraints;

FIG. 19 is a table detailing how many bits are to be allocated for fixed and floating point data types for given specific constraints.

DETAILED DESCRIPTION OF THE INVENTION

Figure 1:
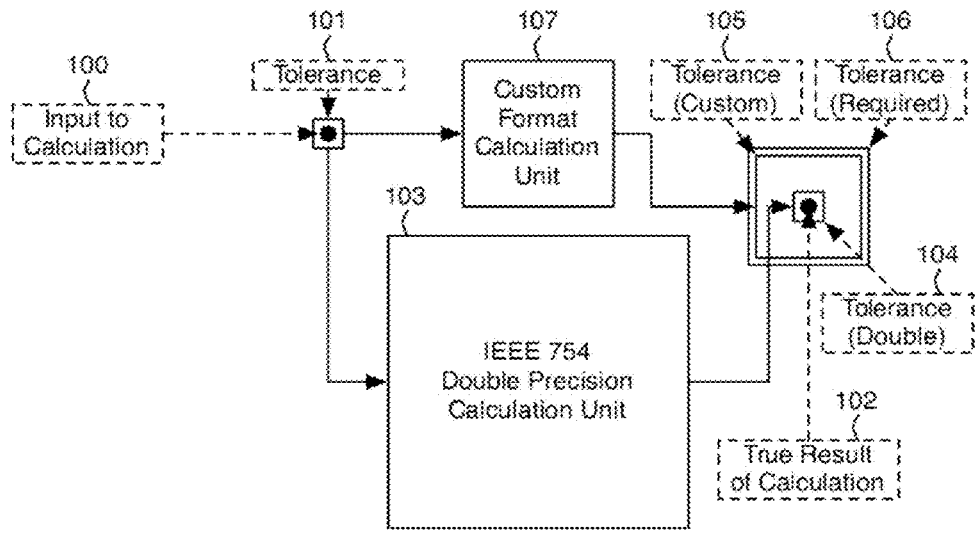
FIG. 1 illustrates a block diagram of a computation system that provides relaxed yet sufficient precision with reduced hardware cost.
Figure 2:
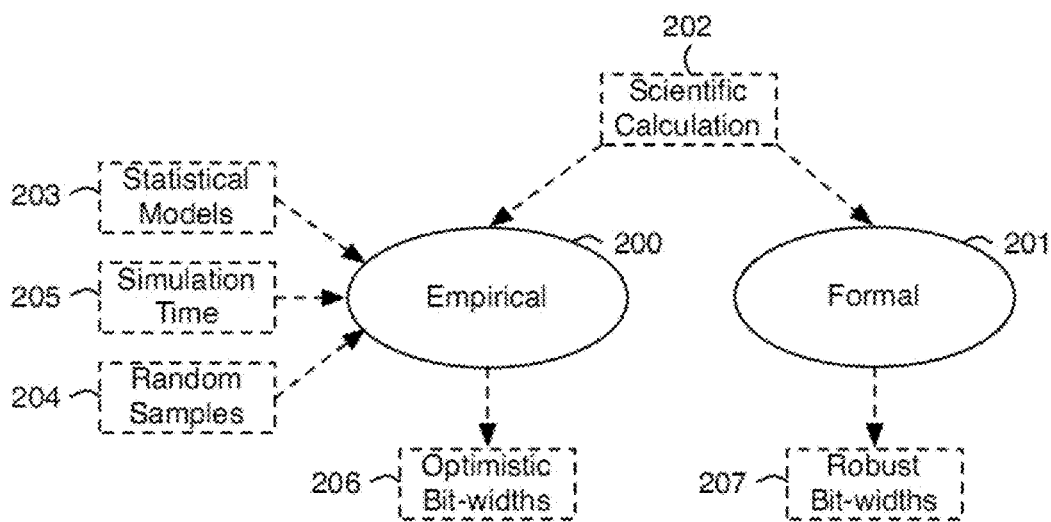
FIG. 2 schematically illustrates the contrasting empirical and formal approaches to scientific calculation.
Figure 3:
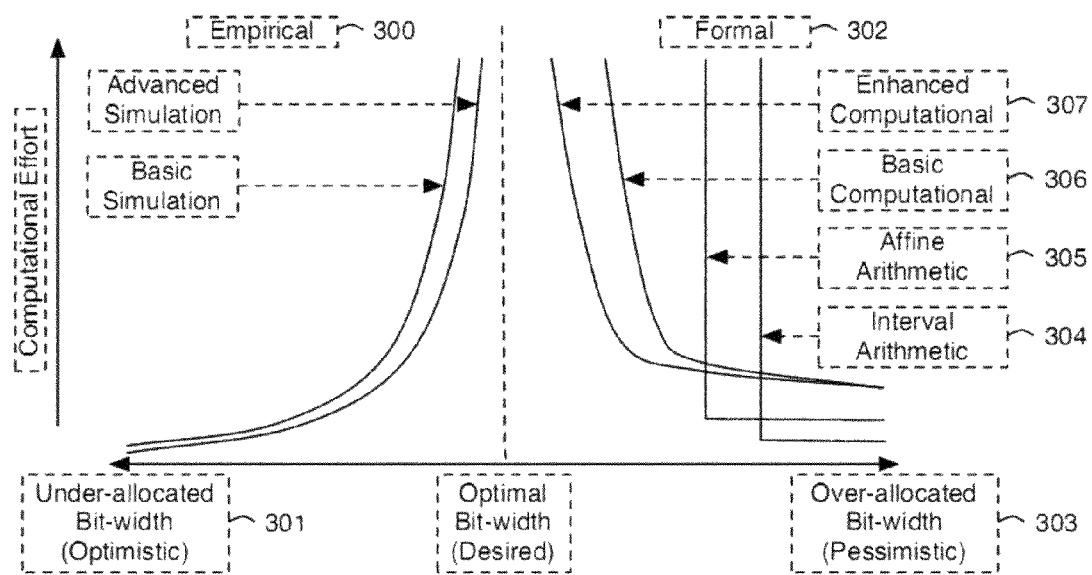
FIG. 3 illustrates the trade-off between bit-width allocation and computational effort.

The challenges associated with scientific computing are addressed herein through a computational approach building on recent developments of computational techniques such as Satisfiability-Modulo Theories (SMT). This approach is shown on the right hand side of FIG. 3 as the basic computational approach 306. While this approach provides robust bit-widths even on ill-conditioned operations, it has limited scalability and is unable to directly address problems involving large vectors that arise frequently in scientific computing.

Given the critical role of computational bit-width allocation for designing hardware accelerators, detailed below is a method to automatically deal with problem instances based on large vectors. While the scalar based approach provides tight bit-widths (provided that it is given sufficient time), its computational requirements are very high. In response, a basic vector-magnitude model is introduced which, while very favorable in computational requirements compared with full scalar expansion, produces overly pessimistic bit-widths. Subsequently there is introduced the concept of block vector, which expands the vector-magnitude model to include some directional information. Due to its ability to tackle larger problems faster, we label this new approach as enhanced computational 307 in FIG. 3. This will enable effective scaling of the problem size, without losing the essential correlations in the dataflow, thus enabling automated bit-width allocation for practical applications.

Without limiting the scope of the invention, part of the invention therefore includes:

A robust computational method to address the range problem of custom data representation;

A means of scaling the computational method to vector based calculations;

A robust computational method to address the precision problem of custom data representation;

An error model for dealing with fixed- and floating-point representations in a unified way;

A robust computational method to address iterative scientific calculations.

To illustrate the issues with prior art bit-width allocation methods, the following two examples are provided.

Let d and r be vectors $\in R^4$, where for both vectors, each component lies in the range $[-100,100]$. Suppose we have:

$$z = \frac{z_1}{z_2} = \frac{d \cdot r}{1 + |d - r|}$$

and we want to determine the range of z for integer bit-width allocation. Table 4 shows the ranges obtained from simulation, affine arithmetic and the proposed method. Notice that simulation underestimates the range by 2 bits after 540 seconds, $\approx 5\times$ the execution time of the proposed method (98 seconds). This happens because only a very small but still important fraction of the input space where d and r are identical (to reduce $z_2$) and large (to increase $z_1$) will maximize z. In contrast, the formal methods always give hard bounds but because the affine estimation of the range of the denominator contains zero, affine arithmetic cannot provide a range for the quotient z.

In order to clarify the context of iterative scientific calculations and to demonstrate the necessity of formal methods, we discuss here, as a second example, an example based on Newton's method, an iterative scientific calculation widely employed in numerical methods. As an example, Newton's method is employed to determine the root of a polynomial: $f(x) = a_3 x^3 + a_2 x^2 + a_1 x + a_0$. The Newton iteration:

$$x_{n+1} = x_n - \frac{f(x_n)}{f'(x_n)}$$

yields the iteration:

$$x_{n+1} = x_n - z_n, z_n$$

$$= \frac{z1_n}{z2_n}$$

$$= \frac{a_3 x_n^3 + a_2 x_n^2 + a_1 x_n + a_0}{3 a_3 x_n^2 + 2 a_2 x_n + a_1}.$$

Such calculations can arise in embedded systems for control when some characteristic of the system is modelled regressively using a $3^{rd}$ degree polynomial. Ranges for the variables are given below:

$$x_0 \in [-100; 100] a_0 \in [-10; 10]$$

$$a_1 \in \left[\frac{15}{2}; \frac{17}{2}\right] a_2 \in \left[\frac{-15}{4}; \frac{-13}{4}\right] a_3 \in \left[\frac{5}{6}; \frac{7}{6}\right]$$

Within the context of scientific computing, robust representations are required, an important criterion for many embedded systems applications. Even for an example of modest size such as this one, if the range of each variable is split into 100 parts, the input space for simulation based methods would be $100^5=10^{10}$. The fact that this immense simulation would have to be performed multiple times (to evaluate error ramifications of each quantization choice), combined with the reality that simulation of this magnitude is still not truly exhaustive and thus cannot substantiate robustness clearly invalidates the use of simulation based methods. Existing formal methods based on interval arithmetic and affine arithmetic also fail to produce usable results due to the inclusion of 0 in the denominator of $z_n$ but computational techniques are able to tackle this example.

Given the inability of simulation based methods to provide robust variable bounds, and the limited accuracy of bounds from affine arithmetic in the presence of strongly non-affine expressions, the following presents a method of range refinement based on SAT-Modulo Theory. A two step approach is taken where loose bounds are first obtained from interval arithmetic, and subsequently refined using SAT-Modulo Theory which is detailed below.

Boolean satisfiability (SAT) is a well known NP-complete problem which seeks to answer whether, for a given set of clauses in a set of Boolean variables, there exists an assignment of those variables such that all the clauses are true. SAT-Modulo theory (SMT) generalizes this concept to first-order logic systems. Under the theory of real numbers, Boolean variables are replaced with real variables and clauses are replaced with constraints. This gives rise to instances such as: is there an assignment of $x, y, z \in R$ for which $x>10, y>25, z<30$ and $z=x+y$, which for this example there is not i.e., this instance is unsatisfiable.

Instances are given in terms of variables with accompanying ranges and constraints. The solver attempts to find an assignment on the input variables (inside the ranges) which satisfies the constraints. Most implementations follow a 2-step model analogous to modern Boolean SAT solvers: 1) the Decision step selects a variable, splits its range into two, and temporarily discards one of the sub-ranges then 2) the Propagation step infers ranges of other variables from the newly split range. Unsatisfiability of a subcase is proven when the range for any variable becomes empty which leads to backtracking (evaluation of a previously discarded portion of a split). The solver proceeds in this way until it has either found a satisfying assignment or unsatisfiability has been proven over the entire specified domain.

Building on this framework, an SMT engine can be used to prove/disprove validity of a bound on a given expression by checking for satisfiability. Noted below is how bounds proving can be used as the core of a procedure addressing the bounds estimation problem.

Figure 5:
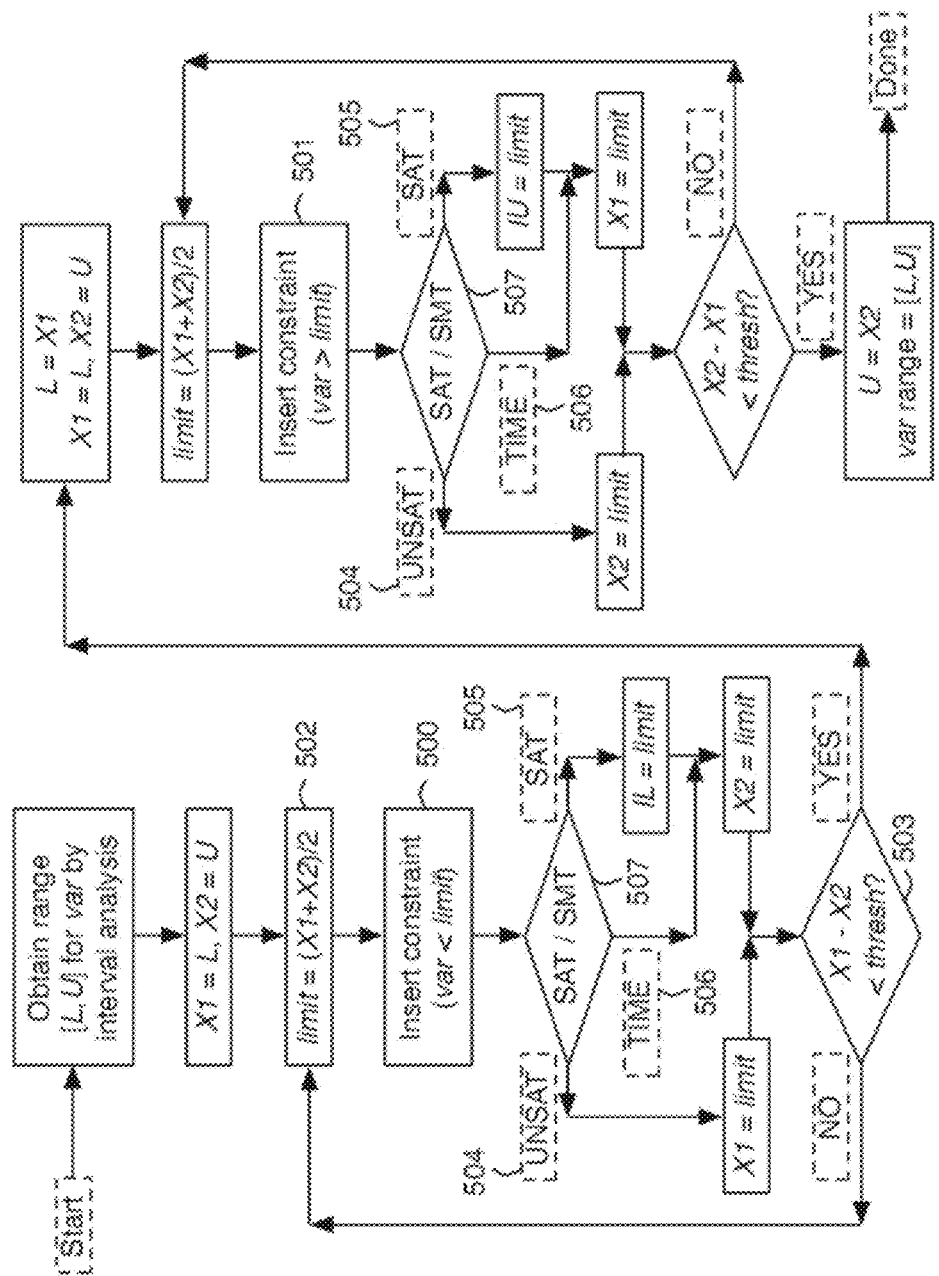
FIG. 5 is a flowchart illustrating a method according to one aspect of the invention which refines a range for a given variable var.

FIG. 5 illustrates the binary search method employed for range analysis on the intermediate variable: var. Note that each SMT instance evaluated contains the inserted constraint (var<limit 500 or var>limit 501). The loop on the left of the figure (between "limit=(X1+X2)/2" 502 and "X2−X1<thresh?" 503) narrows in on the lower bound L, maintaining X1 less than the true (and as yet unknown) lower bound. Each time satisfiability is proven 505, X2 is updated while X1 is updated in cases of unsatisfiability 504, until the gap between X1 and X2 is less than a user specified threshold. Subsequently, the loop on the right performs the same search on the upper bound U, maintaining X2 greater than the true upper bound. Since the SMT solver 507 works on the exact calculation, all interdependencies among variables are taken into account (via the SMT constraints) so the new bounds successively remove over-estimation arising in the original bounds resulting from the use of interval arithmetic.

The overall range refinement process, illustrated in FIG. 6, uses the steps of the calculation and the ranges of the input variables as constraints to set up the base SMT formulation, note that this is where Insert constraint 500 from FIG. 5 inserts to. It then iterates through the intermediate variables applying the process of FIG. 5 to obtain a refined range for that variable. Once all variables have been processed the algorithm returns ranges for the intermediate variables.

As discussed above, non-affine functions with high curvature cause problems for AA, and while these are rare in the context of DSP (as confirmed by the Fang reference) they occur frequently in scientific computing. Division is in particular a problem due to range inversion i.e., quotient increases as divisor decreases. While AA tends to give reasonable (but still overestimated) ranges for compounded multiplication since product terms and the corresponding affine expression grow in the same direction, this is not the case for division. Furthermore, both IA and AA are unequipped to deal with divisors having a range that includes zero.

Use of SMT mitigates these problems, divisions are formulated as multiplication constraints which must be satisfied by the SAT engine, and an additional constraint can be included which restricts the divisor from coming near zero. Since singularities such as division by zero result from the underlying math (i.e. are not a result of the implementation) their effects do not belong to range/precision analysis and SMT provides convenient circumvention during analysis.

While leveraging the mathematical structure of the calculation enables SMT to provide much better run-times than using Boolean SAT (where the entire data path and numerical constraints are modelled by clauses obfuscated the mathematical structure), run-time may still become unacceptable as the complexity of the calculation under analysis grows. To address this, a timeout is used to cancel the inquiry if it does not return before timeout expiry; see 506 in FIG. 5. In this way the trade-off between run-time and the tightness of the variables' bounds can be controlled by the user. If cancelled, inquiry result defaults along the same path as satisfiable in order to maintain robust bounds, i.e. to assume satisfiable gives pessimistic bounds.

Detailed below is a novel approach to bit-width allocation for operation in vector computations and vector calculus.

In order to leverage the vector structure of the calculation and thereby reduce the complexity of the bit-width problem to the point of being tractable, the independence (in terms of range/bit-width) of the vector components as scalars is given up. At the same time, hardware implementations of vector based calculations typically exhibit the following:

Vectors are stored in memories with the same number of data bits at each address;

Data path calculation units are allocated to accommodate the full range of bit-widths across the elements of the vectors to which they apply;

Based on the above, the same number of bits tends to be used implicitly for all elements within a vector, which is exploited by the bit-width allocation problem. As a result, the techniques laid out below result in uniform bit-widths within a vector, i.e., all the elements in a vector use the same representation, however, each distinct vector will still have a uniquely determined bit-width.

The approach to dealing with problems specified in terms of vectors centers around the fact that no element of a vector can have (absolute) value greater than the vector magnitude i.e., for a vector $x \in R^n$:

$$x = (x_0, x_1, \ldots, x_{n-1})$$

$$\|x\| = \sqrt{x^T x}$$

$$|x_i| \le \|x\|, 0 \le i \le n-1$$

Starting from this fact, we can create from the input calculation a vector-magnitude model which can be used to obtain bounds on the magnitude of each vector, from which the required uniform bit-width for that vector can be inferred.

Creating the vector-magnitude model involves replacing elementary vector operations with equivalent operations bounding vector magnitude, Table 7 contains the specific operations used in this document. When these substitutions are made, the number of variables for which bit-widths must be determined can be significantly reduced as well as the number of expressions, especially for large vectors.

TABLE 7

| Name | Vector Operation | Magnitude Model |
|---|---|---|
| Dot Product | x · y | $\|x\|\|y\|\cos(\theta_{xy})$ |
| Addition | x + y | $\sqrt{\|x\|^2 + \|y\|^2 + 2x \cdot y}$ |
| Subtraction | x − y | $\sqrt{\|x\|^2 + \|y\|^2 - 2x \cdot y}$ |
| Matrix Multiplication | Ax | $\sigma\|x\|$ $\|\sigma_A^{min}\| \le \sigma \le \|\sigma_A^{max}\|$ |
| Pointwise Product | x ∘ y | $\epsilon\|x\|\|y\|$ $0 \le \epsilon \le 1$ |

The entries of Table 7 arise either as basic identities within, or derivations from, vector arithmetic. The first entry is simply one of the definitions of the standard inner product, and the addition and subtraction entries are resultant from the parallelogram law. The matrix multiplication entry is based on knowing the singular values $\sigma_i$ of the matrix and the pointwise product comes from: $\Sigma x_i^2 y_i^2 \le (\Sigma x_i^2)(\Sigma y_i^2)$ While significantly reducing the complexity of the range determination problem, the drawback to using this method is that directional correlations between vectors are virtually unaccounted for. For example, vectors x and Ax are treated as having independent directions, while in fact the true range of vector x+Ax may be restricted due to the interdependence. In light of this drawback, below is proposed a means of restoring some directional information without reverting entirely to the scalar expansion based formulation.

As discussed above, bounds on the magnitude of a vector can be used as bounds on the elements, with the advantage of significantly reduced computational complexity. In essence, the vector structure of the calculation (which would be obfuscated by expansion to scalars) is leveraged to speed up range exploration. These two methods of vector-magnitude and scalar expansion form the two extremes of a spectrum of approaches, as illustrated in FIG. 8. At the scalar side 800, there is full description of interdependencies, but much higher computational complexity which limits how thoroughly one can search for the range limits 801. At the vector-magnitude side 802 directional interdependencies are almost completely lost but computational effort is significantly reduced enabling more efficient use of range search effort 803. A trade-off between these two extremes is made accessible through the use of block vectors 804, which this section details.

Simply put, expanding the vector-magnitude model to include some directional information amounts to expanding from the use of one variable per vector (recording magnitude) to multiple variables per vector, but still fewer than the number of elements per vector. Two natural questions arise: what information to store in those variables? If multiple options of similar compute complexity exist, then how to choose the option that can lead to tighter bounds?

Figure 9:
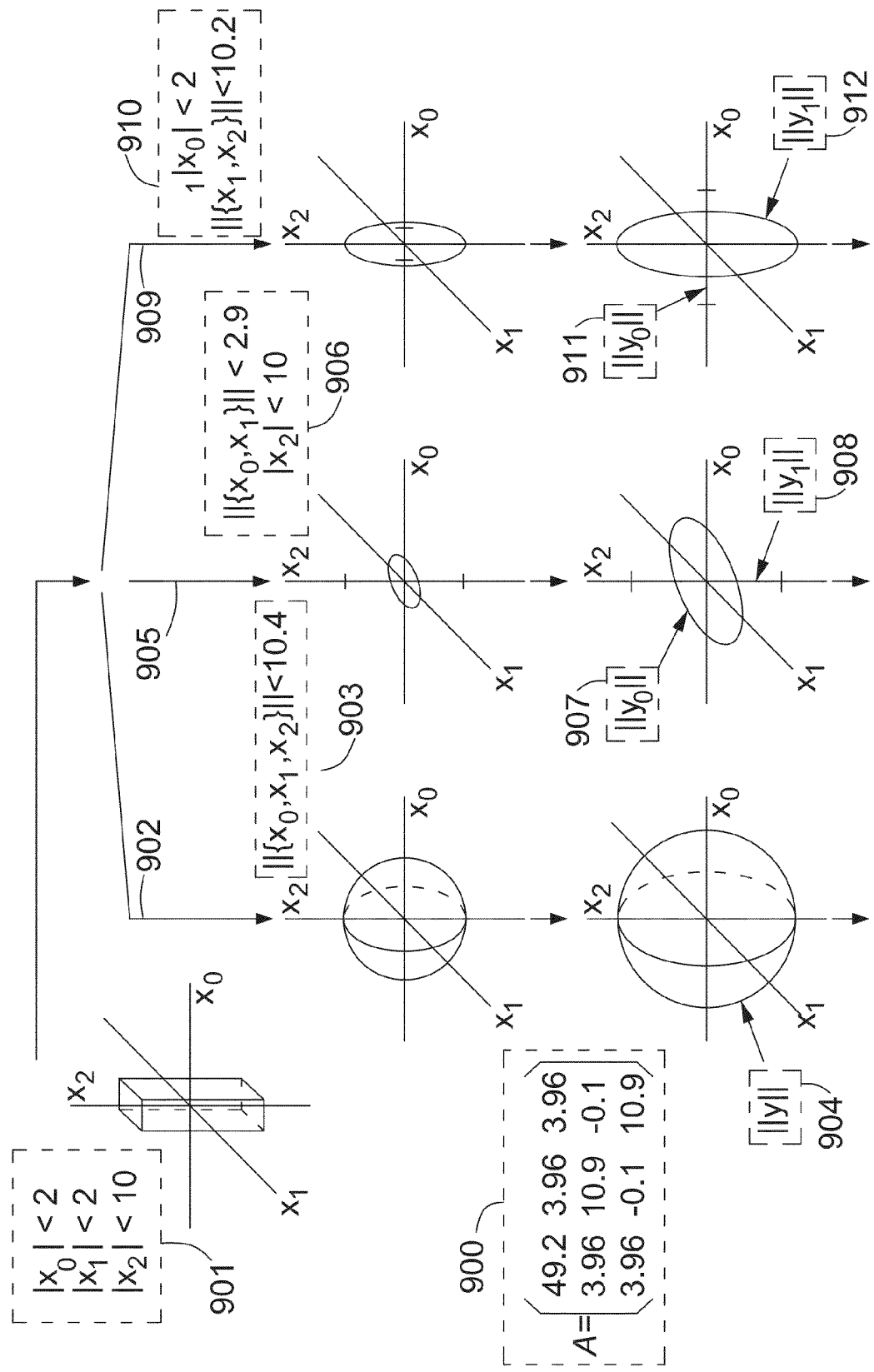
FIG. 9 are graphs illustrating three different approaches to partitioning a vector operation.

As an example to the above, consider a simple 3×3 matrix multiplication y=Ax, where $x,y \in R^3$ and $x = [x_0, x_1, x_2]^T$. FIG. 9 shows an example matrix A (having $9.9 \le \sigma_A \le 50.1$) 900 as well as constraints on the component ranges of x 901. In the left case in the FIG. 902, the vector-magnitude approach is applied: $\|x\|$ is bounded by $\sqrt{2^2 + 2^2 + 10^2} = 10.4$ 903, and the bound on $\|y\|$ 904 is obtained as $\sigma_A^{max}\|x\|$ which for this example is 50.1×10.4≈521.

The vector-magnitude estimate of ≈521 can be seen to be relatively poor, since true component bounds for matrix multiplication can be relatively easily calculated, ≈146 in this example. The inflation results from dismissal of correlations between components in the vector, which we address through the proposed partitioning into block vectors. The middle part of FIG. 9 905 shows one partitioning possibility, around the component with the largest range, i.e. $x_0' = [x_0, x_1]^T$, $x_1' = x_2$ 906. The input bounds now translate into a circle in the $[x_0, x_1]$-plane and a range on the $x_2$-axis. The corresponding partitioning of the matrix is:

$$A = \begin{bmatrix} A_{00} A_{01} \\ A_{10} A_{11} \end{bmatrix}$$

$$\begin{bmatrix} y_0 \\ y_1 \end{bmatrix} = \begin{bmatrix} A_{00} A_{01} \\ A_{10} A_{11} \end{bmatrix} \begin{bmatrix} x_0 \\ x_1 \end{bmatrix}$$

where $10.4 \le \sigma_{A_{00}} \le 49.7$ and $0 \le \sigma_{A_{01}}$, $\sigma_{A_{10}} \le 3.97$ and simply $A_{11} = \sigma_{A_{11}} = 10.9$. Using block vector arithmetic (which bears a large degree of resemblance to standard vector arithmetic) it can be shown that $y_0 = A_{00} x_0 + A_{01} x_1$ and $y_1 = A_{10} x_0 + A_{11} x_1$. Expanding each of these equations using vector-magnitude in accordance with the operations from Table 7, we obtain:

$$\|y_0\| = \sqrt{(\sigma_{A_{00}}\|x_0\|)^2 + (\sigma_{A_{01}}\|x_1\|)^2 + 2\sigma_{A_{00}}\sigma_{A_{01}}\|x_0\|\|x_1\|}$$

$$\|y_1\| = \sqrt{(\sigma_{A_{10}}\|x_0\|)^2 + (\sigma_{A_{11}}\|x_1\|)^2 + 2\sigma_{A_{10}}\sigma_{A_{11}}\|x_0\|\|x_1\|}$$

As the middle part of FIG. 9 905 shows, applying the vector-magnitude calculation to the partitions individually amounts to expanding the $[x_0, x_1]$-plane circle, and expanding the $x_2$ range, after which these two magnitudes can be recombined by taking the norm of $[y_0, y_1]^T$ to obtain the overall magnitude $\|y\| = \sqrt{\|y_0\|^2 + \|y_1\|^2}$. By applying the vector-magnitude calculation to the partitions individually, the directional information about the component with the largest range is taken into account. This yields $\|y_0\| \le \approx 183$ 907 and $\|y_1\| \le \approx 154$ 908, thus producing the bound $\|y\| \le \approx 240$.

The right hand portion of FIG. 9 909 shows an alternative way of partitioning the vector, with respect to the basis vectors of the matrix A. Decomposition of the matrix used in this example reveals the direction associated with the largest $\sigma_A$ to be very close to the $x_0$ axis. Partitioning in this way (i.e., $x_0=x_0$, $x_1=[x_1, x_2]^T$ 910) results in the same equations as above for partitioning around $x_2$, but with different values for the sub-matrices: $A_{00}=\sigma_{A_{00}}=49.2$ and $0\leq\sigma_{A_{01}}$, $\sigma_{A_{10}}\leq 5.61$ and $10.8\leq\sigma_{A_{11}}\leq 11.0$. As the figure shows, we now have range on the $x_0$-axis and a circle in the $[x_1, x_2]$-plane which expands according the same rules (with different numbers) as before yielding this time: $\|y_0\|\leq\approx 137$ 911 and $\|y_1\|\leq\approx 124$ 912 producing a tighter overall magnitude bound $\|y\|\leq\approx 185$.

Given the larger circle resulting from this choice of expansion, it may seem surprising the bounds obtained are tighter in this case. However, consider that in the $x_0$ direction (very close to the direction of the largest $\sigma_A$), the bound is overestimated by $2.9/2\approx 1.5$ in the middle case 905 while it is exact in the rightmost case 909. Contrast this to the overestimation of the magnitude in the $[x_1, x_2]$-plane of only about 2% yet, different basis vectors for A could still reverse the situation. Clearly the decision on how to partition a vector can have significant impact on the quality of the bounds. Consequently, below is a discussion on an algorithmic solution for this decision.

Recall that in the cases from the middle and right hand portions of FIG. 9, the magnitude inflation is reduced, but for two different reasons. Considering this fact from another angle, it can be restated that the initial range inflation (which we are reducing by moving to block vectors) arises as a result of two different phenomena; 1) inferring larger ranges for individual components as a result of one or a few components with large ranges as in the middle case or 2) allowing any vector in the span defined by the magnitude to be scaled by the maximum $\sigma_A$ even though this only really occurs along the direction of the corresponding basis vector of A.

In the case of magnitude overestimation resulting from one or a few large components, the impact can be quantified using range inflation: $f_{vec}(x)=\|x\|/\|\hat{x}\|$, where $\hat{x}$ is $x$ with the largest component removed. Intuitively, if all the components have relatively similar ranges, this expression will evaluate to near unity, but removal of a solitary large component range will have a value larger than and farther from 1, as in the example from FIG. 9 (middle) of $10.4/2.9=3.6$ Turning to the second source of inflation based on $\sigma_A$, we can similarly quantify the penalty of using $\sigma_A$ over the entire input span by evaluating the impact of removing a component associated with the largest $\sigma_A$. If we define $\alpha$ as the absolute value of the largest component of the basis vector corresponding to $\sigma_A^{max}$, and $\hat{A}$ as the block matrix obtained by removing that same component's corresponding row and column from A we can define: $f_{mat}(A)=\alpha\sigma_A^{max}/\sigma_{\hat{A}}^{max}$, where $\sigma_{\hat{A}}^{max}$ is the maximum across the $\sigma^{max}$ of each sub-matrix of $\hat{A}$. The $\alpha$ factor is required to weight the impact of that basis vector as it relates to an actual component of the vector which A multiplies. When $\sigma_A^{max}$ is greater than the other $\sigma_A$, $f_{mat}$ will increase (FIG. 9—right) to $0.99\times 49.2/11.0=4.4$. Note finally that the partition with the greater value ($4.4\geq 3.6$) produces the tighter magnitude bound ($185<240$).

FIG. 10 shows the steps involved in extracting magnitude bounds (and hence bit-widths) of a vector based calculation. Taking the specification in terms of the calculation steps, and input variables and their ranges, VectorMagnitudeModel on line 1 creates the base vector-magnitude model as above. The method then proceeds by successively partitioning the model (line 5) and updating the magnitudes (line 7) until either no significant tightening of the magnitude bounds occurs (as defined by GainThresh in line 9) or until the model grows to become too complex (as defined by SizeThresh in line 10). Note that the DetermineRanges function (line 7) is based upon bounds estimation techniques, the computational method from above (although other techniques such as affine arithmetic may be substituted). The Partition function (line 5) utilizes the impact functions $f_{vec}$ and $f_{mat}$ to determine a good candidate for partitioning. Computing the $f_{vec}$ function for each input vector is inexpensive, while the $f_{mat}$ function involves two largest singular (eigen) value calculations for each matrix. It is worth noting however that a partition will not change the entire Model, and thus many of the $f_{vec}$ and $f_{mat}$ values can be reused across multiple calls of Partition.

Detailed below is an approach to solving the custom-representation bit-width allocation problem for general scientific calculations. An error model to unify fixed-point and floating-point representations is given first and a later section shows how a calculation is mapped under this model into SMT constraints. Following this, there is a discussion on how to break the problem for iterative calculations down using an iterative analysis phase into a sequence of analyses on direct calculations.

Fixed-point and floating-point representations are typically treated separately for quantization error analysis, given that they represent different modes of uncertainty: absolute and relative respectively. Absolute error analysis applied to fixed-point numbers is exact however, relative error analysis does not fully represent floating-point quantization behaviour, despite being relied on solely in many situations. The failure to exactly represent floating-point quantization arises from the finite exponent field which limits the smallest magnitude, non-zero number which can be represented. In order to maintain true relative error for values infinitesimally close to zero, the quantization step size between representable values in the region around zero would itself have to be zero. Zero step size would of course not be possible since neighbouring representable values would be the same. Therefore, real floating-point representations have quantization error which behaves in an absolute way (like fixed-point representations) in the region of this smallest representable number. For this reason, when dealing with floating-point error tolerances, consideration must be given to the smallest representable number, as illustrated in the following example.

For this example, consider the addition of two floating-point numbers: $a+b=c$ with $a,b \in [10,100]$, each having a 7 bit mantissa yielding relative error bounded by $\approx 1\%$. The value of $c$ is in $[20,200]$, with basic relative error analysis for c giving 1%, which in this case is reliable.

Consider now different input ranges: $a,b \in [-100,100]$, but still the same tolerances (7 bits $\approx 1\%$). Simplistic relative error analysis should still give the same result of 1% for c however, the true relative error is unbounded. This results from the inability to represent infinitesimally small numbers, i.e. the relative error in a,b is not actually bounded by 1% for all values in the range. A finite number of exponent bits limits the smallest representable number, leading to unbounded relative error for non-zero values quantized to zero.

In the cases above, absolute error analysis would deal accurately with the error. However, it may produce wasteful representations with unnecessarily tight tolerances for large numbers. For instance, absolute error of 0.01 for a,b (7 fraction bits) leads to absolute error of 0.02 for c, translating into a relative error bound of 0.01% for c=200 (maybe unnecessarily tight) and 100% for c=0.02 (maybe unacceptably loose). This tension between relative error near zero and absolute error far from zero motivates a hybrid error model.

Figure 11:
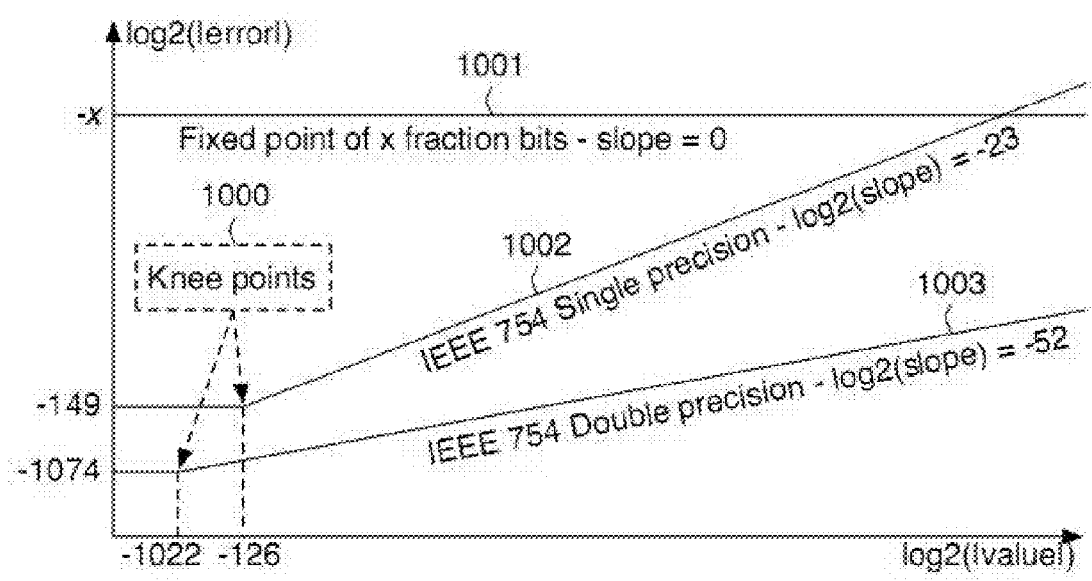
FIG. 11 shows a graph showing the concept of knee points according to another aspect of the invention.

FIG. 11 shows a unified absolute/relative error model dealing simultaneously with fixed- and floating-point numbers by restricting when absolute or relative error applies. Error is quantified in terms of two numbers (knee and slope as described below) instead of just one as in the case of absolute and relative error analysis. Put simply, the knee point 1100 divides the range of a variable into absolute and relative error regions, and slope indicates the relative error bound in the relative region (above and to the right of the knee point). Below and to the left of the knee point, the absolute error is bounded by the value knee, the absolute error at the knee point (which sits at the value knee/slope). We thus define:

knee: absolute error bound below the knee-point knee point=knee/slope: value at which error behaviour transitions from absolute to relative slope: fraction of value which bounds the relative error in the region above the knee point.

Of more significance than just capturing error behaviour of existing representations (fixed-point 1101, IEEE-754 single 1102 and double 1103 precision as in FIG. 11), is the ability to provide more descriptive error constraints to the bit-width allocation than basic absolute or relative error bounds. Through this model, a designer can explicitly specify desired error behaviour, potentially opening the door to greater optimization than possible considering only absolute or relative error alone (which are both subsumed by this model). Bit-width allocation under this model is also no longer fragmented between fixed- and floating-point procedures. Instead, custom representations are derived from knee and slope values obtained subject to the application constraints and optimization objectives. Constructing precision constraints for an SMT formulation will be discussed later, while translation of application objectives into such constraints is also covered below.

The role of precision constraints is to capture the precision behaviour of intermediate variables, supporting the hybrid error model above. Below we discuss derivation of precision expressions, as well as how to form constraints for the SMT instance. We define four symbols relating to an intermediate (e.g., x):

1. the unaltered variable x stands for the ideal abstract value in infinite precision, 2. x stands for the finite precision value of the variable, 3. $\Delta x$ stands for accumulated error due to finite precision representation, so $x = x + \Delta x$, 4. $\delta x$ stands for the part of $\Delta x$ which is introduced during quantization of x.

Using these variables, the SMT instance can keep track symbolically of the finite precision effects, and place constraints where needed to satisfy objectives from the specification. In order to keep the size of the precision (i.e., $\Delta x$) terms from exploding, atomic precision expressions can be derived at the operator level. For division for example, the infinite precision expression z=x/y is replaced with:

$$z = \overline{x}/\overline{y}$$

$$\overline{z} \cdot \overline{y} = \overline{x}$$

$$(z + \Delta z)(y + \Delta y) = x + \Delta x$$

$$zy + z\Delta y + y\Delta z + \Delta y \Delta z = x + \Delta x$$

$$y\Delta z + \Delta y \Delta z = \Delta x - z\Delta y$$

$$\Delta z = \frac{\Delta x - z\Delta y}{y + \Delta y}.$$

What is shown above describes the operand induced error component of $\Delta z$, measuring the reliability of z given that there is uncertainty in its operands. If next z were cast into a finite precision data type, this quantization results in:

$$\Delta z = \frac{\Delta x - z\Delta y}{y + \Delta y} + \delta z$$

where $\delta z$ captures the effect of the quantization. The quantization behaviour can be specified by what kind of constraints are placed on $\delta z$, as discussed in more detail below.

The same process as for division above can be applied to many operators, scalar and vector alike. Table 12 shows expressions and accompanying constraints for common operators. In particular the precision expression for square root as shown in row 7 of the table highlights a principal strength of the computational approach, the use of constraints rather than assignments. Allowing only forward assignments would result in a more complicated precision expression (involving use of the quadratic formula), whereas the constraint-centric nature of SMT instances permits a simpler expression.

TABLE 12

| Operator | Infinite Precision (Expression) | Finite Precision (Constraint) |
|---|---|---|
| Addition | z = x + y | $\Delta z = \Delta x + \Delta y + \delta z$ |
| Subtraction | z = x − y | $\Delta z = \Delta x - \Delta y + \delta z$ |
| Multiplication | z = xy | $\Delta z = x\Delta y + y\Delta x + \Delta x\Delta y + \delta z$ |
| Division | z = x/y | $\Delta z = \frac{\Delta x - z\Delta y}{y + \Delta y} + \delta z$ |
| Square root | z = √x | $(\Delta z)^2 + 2(z - \delta z)\Delta z = \Delta x - (\delta z)^2 + 2z\delta z$ |
| Vector inner product | z = $x^T y$ | $\Delta z = x^T(\Delta y) + (\Delta x)^T y + (\Delta x)^T(\Delta y) + \delta z$ |
| Matrix-vector product | z = Ax | $\Delta z = A(\Delta x) + (\Delta A)x + (\Delta A)(\Delta x) + \delta z$ |

Beyond the operators of Table 12, constraints for other operators can be derived under the same process shown for division, or operators can be compounded to produce more complex calculations. As an example, consider the quadratic form $z = x^T A x$, for which error constraints can be obtained by explicit derivation (starting from $\overline{z} = \overline{x}^T A \overline{x}$) or by compounding an inner product with a matrix multiplication $x^T(Ax)$. Furthermore, constraints of other types can be added, for instance to capture the discrete nature of constant coefficients for exploitation similarly to the way they are exploited in the Radecka reference.

Careful consideration must be given to the $\delta$ terms when capturing an entire dataflow into an SMT formulation. In each place where used they must capture error behaviour for the entire part of the calculation to which they apply. For example, a matrix multiplication implemented using multiply accumulate units at the matrix/vector element level may quantize the sum throughout accumulation for a single element of the result vector. In this case it is not sufficient for the $\delta z$ for matrix multiplication from Table 12 to capture only the final quantization of the result vector into a memory location, the internal quantization effects throughout the operation of the matrix multiply unit must also be considered. What is useful about this setup is the ability to model off-the-shelf hardware units (such as matrix multiply) within our methodology, so long as there is a clear description of the error behaviour.

Also of importance for $\delta$ terms is how they are constrained to encode quantization behaviour. For fixed-point quantization, range is simply bounded by the rightmost fraction bit. For example, a fixed-point data type with 32 fraction bits and quantization by truncation (floor), would use a constraint of $-2^{-32} < \delta x \leq 0$. Similarly for rounding and ceiling, the constraints would be $-2^{-33} \leq \delta x \leq 2^{-33}$ and $0 \leq \delta x < 2^{-32}$ respectively.

These constraints are loose (thus robust) in the sense that they assume no correlation between quantization error and value, when in reality correlation may exist. If the nature of the correlation is known, it can be captured into constraints (with increased instance complexity). The tradeoff between tighter error bounds and increased instance complexity must be evaluated on an application by application basis; the important point is that the SMT framework provides the descriptive power necessary to capture known correlations.

Figure 13:
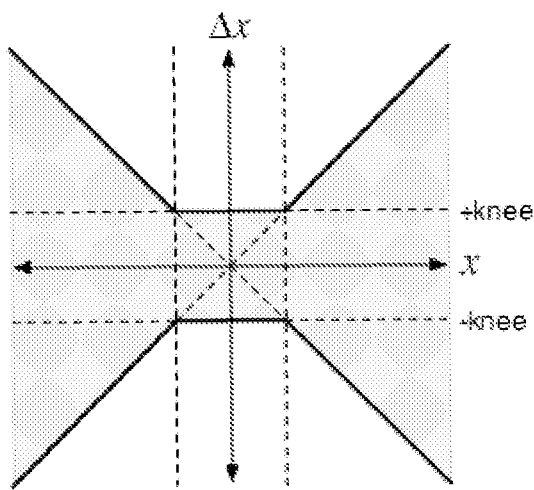
FIG. 13 illustrates the error region for a custom floating point number.

In contrast to fixed-point quantization, constraints for custom floating-point representations are more complex because error is not value-independent as seen in FIG. 13. The use of Δ in the figure indicates either potential input error or tolerable output error of a representation, and in the discussion which follows the conclusions drawn apply equally to quantization if Δ is replaced with δ. Possibly the simplest constraint to describe this region indicated in FIG. 13 would be:

$$\text{abs}(\Delta x) \leq \max(\text{slope}_x \times \text{abs}(x), \text{knee}_x)$$

provided that the abs( ) and max( ) functions are supported by the SMT solver. If not supported, and noting that another strength of the SMT framework is the capacity to handle both numerical and Boolean constraints, various constraint combinations exist to represent this region.

FIG. 14 shows numerical constraints which generate Boolean values and the accompanying region of the error space in which they are true. From this, a number of constraints can be formed which isolate the region of interest. For example, note that the unshaded region of FIG. 13, where the constraint should be false, is described by:

$$\{(\overline{C1}\&\overline{C2}\&C3)|(C1\&C2\&C4)\}$$

noting that $\overline{C1}$ refers to Boolean complementation and not finite precision as used elsewhere in this document and that & and | refer to the Boolean AND and OR relations respectively. The complement of this produces a pair of constraints which define the region in which we are interested (note that C3 and C4 are never simultaneously true):

$$\{\overline{C1}|\overline{C2}|\overline{C4}\} \quad \{C1|C2|\overline{C3}\}$$

$$\left\{\begin{array}{l}(\Delta r > \text{slope}_x \cdot x)| \\ (\Delta x > -\text{slope}_x \cdot x)| \\ (\Delta x \geq -\text{knee}_x)\end{array}\right\} \quad \left\{\begin{array}{l}(\Delta x \leq \text{slope}_x \cdot x)| \\ (\Delta x \leq -\text{slope}_x \cdot x) \\ (\Delta x \leq \text{knee}_x)\end{array}\right\}$$

While the one (custom, in house developed) solver used for our experiments does not support the abs( ) and max( ) functions, the other (off-the-shelf solver, HySAT), does provide this support. Even in this case however, the above Boolean constraints can be helpful alongside the strictly numerical ones. Providing extra constraints can help to speed the search by leading to a shorter proof since proof of unsatisfiability is what is required to give robustness [see the Kinsman and Nicolici reference]. It should also be noted that when different solvers are used, any information known about the solver's search algorithm can be leveraged to set up the constraints in such a way to maximize search efficiency. Finally, while the above discussion relates specifically to our error model, it is by no means restricted to it—any desired error behaviour which can be captured into constraints is permissible. This further highlights the flexibility gained by using the computational approach. Detailed below is an approach which partitions iterative calculations into pieces which can be analyzed by the established framework.

Figure 15:
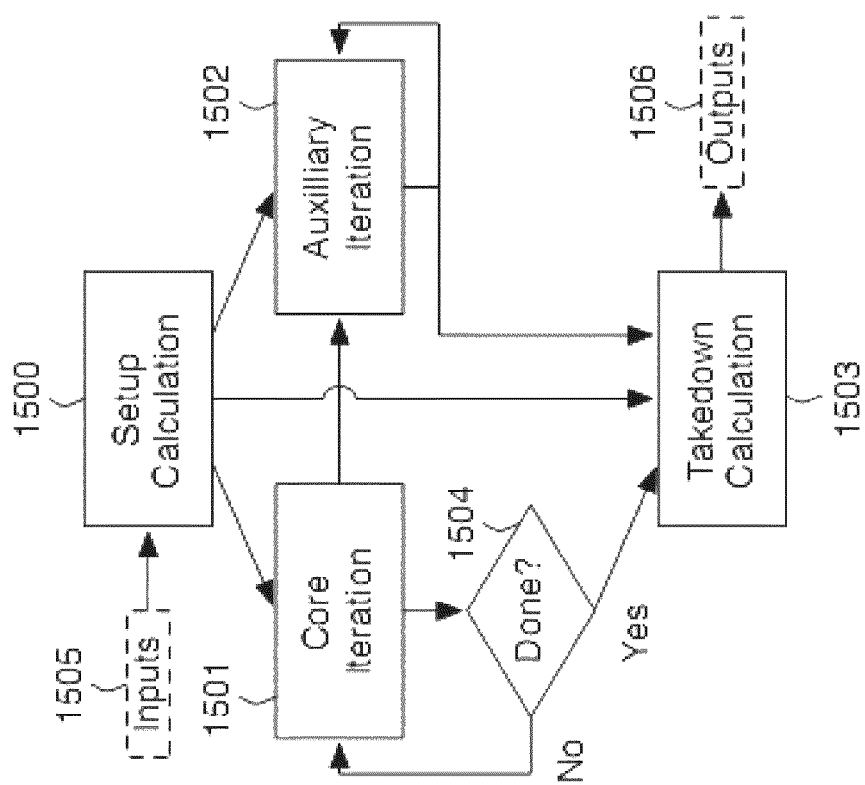
FIG. 15 is a block diagram detailing the various portions of a general iterative calculation.

There are in general two main categories of numerical schemes for solving scientific problems: 1) direct where a finite number of operations leads to the exact result and 2) iterative where applying a single iteration refines an estimate of the final result which is converged upon by repeated iteration. FIG. 15 shows one way how an iterative calculation may be broken into sub-calculations which are direct, as well as the data dependency relationships between the sub-calculations. Specifically, the Setup 1500, Core 1501, Auxiliary 1502 and Takedown 1503 blocks of FIG. 15 represent direct calculations, and Done? 1504 may also involve some computation, producing (directly) an affirmative/negative answer. The Setup 1500 calculations provide (based on the inputs 1505) initial iterates, which are updated by Core 1501 and Auxiliary 1502 until the termination criterion encapsulated by Done 1504 is met, at which point post-processing to obtain the final result 1506 is completed by Takedown 1503, which may take information from Core 1501, Auxiliary 1502 and Setup 1500. What distinguishes the Core 1501 iteration from Auxiliary 1502 is that Core 1501 contains only the intermediate calculations required to decide convergence. That is, the iterative procedure for a given set of inputs 1505 will still follow the same operational path if the Auxiliary 1502 calculations are removed. The reason for this distinction is twofold: 1) convergence analysis for Core 1501 can be handled in more depth by the solver when calculations that are spurious (with respect to convergence) are removed, and 2) error requirements of the two parts may be more suited to different error analysis with the potential of leading to higher quality solutions.

Figure 16:
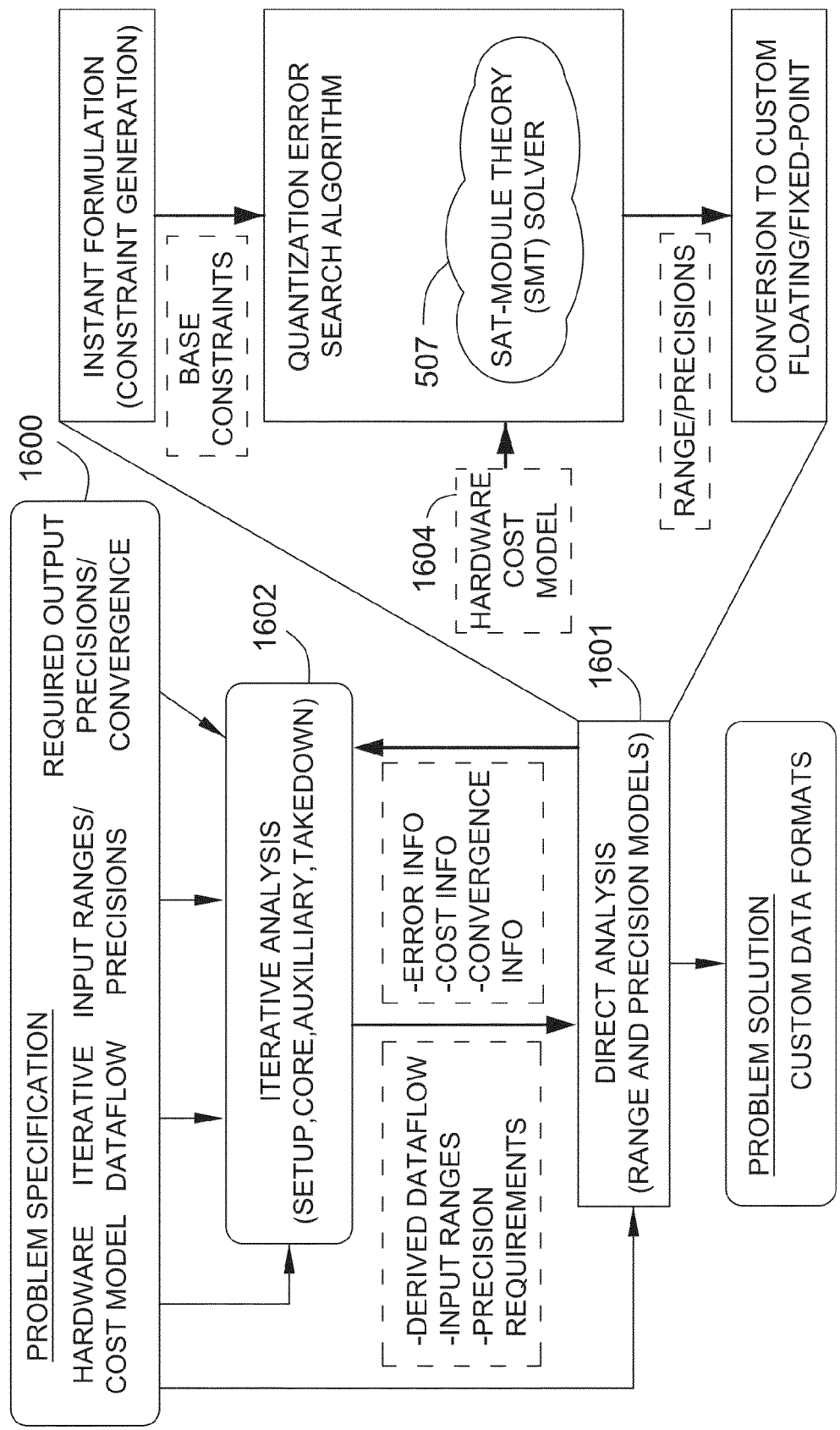
FIG. 16 is a block diagram detailing a conceptual flow for solving the bit-width allocation problem for iterative numerical calculations.

Under the partitioning scheme of FIG. 15, the top level flow for determining representations is shown in FIG. 16. The left half of the figure depicts the partitioning and iterative analysis phases of the overall process, while the portion on the right shows bounds estimation and representation search applied to direct analysis. The intuition behind FIG. 16 is as follows:

At the onset, precision of inputs and precision requirements of outputs are known as part of the problem specification 1600

Direct analysis 1601 on the Setup 1500 stage with known input precision provides precision of inputs to the iterative stage Direct analysis 1601 on the Takedown 1503 stage with known output precision requirements provides output precision requirements of the iterative stage Between the above, and iterative analysis 1602 leveraging convergence information, forward propagation of input errors and the backward propagation of output error constraints provide the conditions for direct analysis of the Core 1501 and Auxiliary 1502 iterations.

Building on the robust computational foundation established in the Kinsman references, FIG. 16 shows how SMT is leveraged through formation of constraints for bounds estimation. Also shown is the representation search 1603 which selects and evaluates candidate representations based on feedback from the hardware cost model 1604 and the bounds estimator 507. The reason for the bidirectional relationship between iterative 1602 and direct 1601 analysis is to retain the forward/backward propagation which marks the SMT method and thus to retain closure between the range/precision details of the algorithm inputs and the error tolerance limits imposed on the algorithm output. These iterative and direct analysis blocks will be elaborated in more detail below.

As outlined above, the role of iterative analysis within the overall flow is to close the gap between forward propagation of input error, backward propagation of output error constraints and convergence constraints over the iterations. The plethora of techniques to provide detailed convergence information on iterative algorithms developed throughout the history of numerical analysis testify to the complexity of this problem and the lack of a one-size-fits all solution. Not completely without recourse, one of the best aids that can be provided in our context of bit-width allocation is a means of extracting constraints which encode information specific to the convergence/error properties of the algorithm under analysis.

Figure 17:
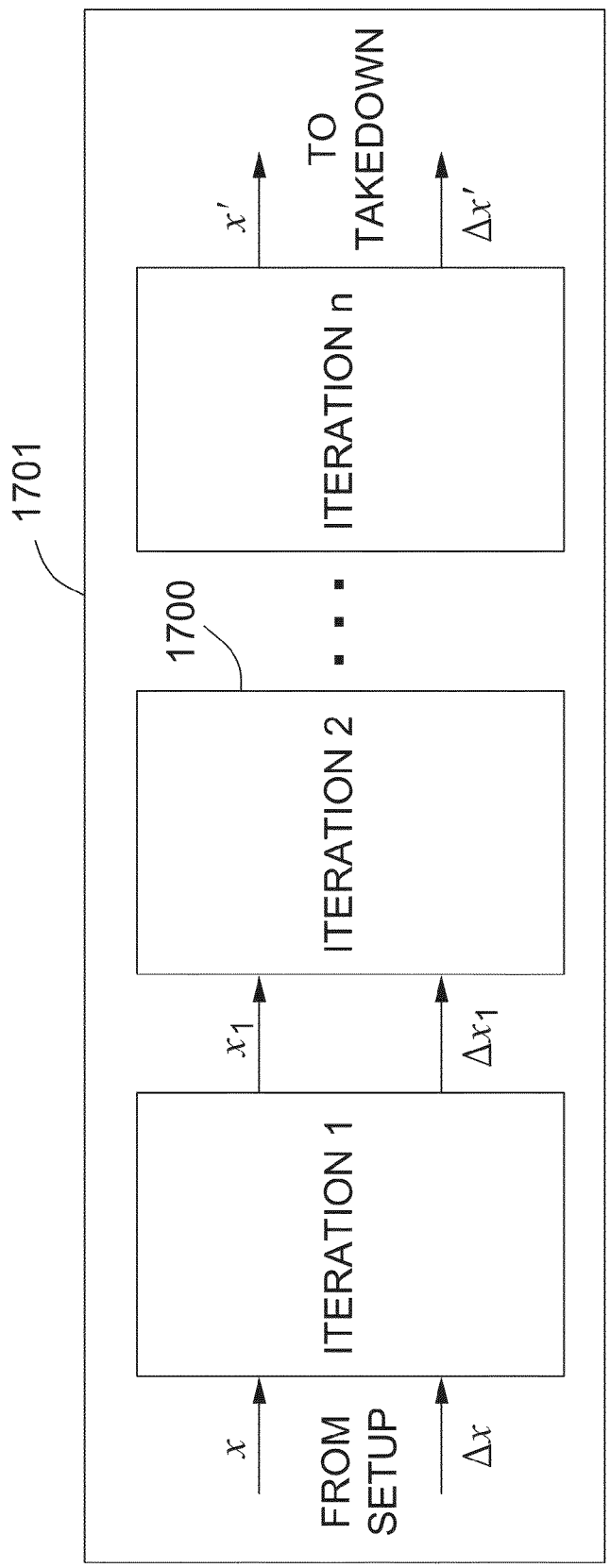
FIG. 17 is a schematic diagram illustrating an unrolling of an iterative calculation.

A simplistic approach to iterative analysis would merely "unroll" the iteration, as shown in FIG. 17. A set of independent solver variables and dataflow constraints would be created for the intermediates of each iteration 1700 and the output variables of one iteration would feed the input of the next. While attractive in terms of automation (iteration dataflow replication is easy) and of capturing data correlations across iterations, the resulting instance 1701 can become large. As a result, solver run-times can explode, providing in reality very little meaningful feedback due to timeouts [see the Kinsman and Nicolici reference]. Furthermore, conditional termination (variable number of iterations) can further increase instance complexity.

Figure 18:
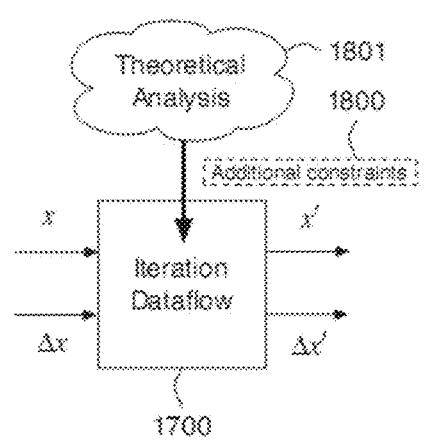
FIG. 18 is a schematic diagram illustrating how iterative analysis may use information from a theoretical analysis.

For the reasons above, it is preferred to base an instance for the iterative part on a single iteration dataflow, augmented with extra constraints as shown in FIG. 18. The challenge then becomes determining those constraints 1800 which will ensure desired behaviour over the entire iterative phase of the numerical calculation. Such constraints can be discovered within the theoretical analysis 1801 of the algorithm of interest. While some general facts surrounding iterative methods do exist (e.g., Banach fixed point theorem in Istratescu reference), the guidance provided to the SMT search by such facts is limited by their generality. Furthermore, the algorithm designer/analyst ought (in general) to have greater insight into the subtleties of the algorithm than the algorithm user, including assumptions under which it operates correctly.

To summarize the iterative analysis process, consider that use of SMT essentially automates and accelerates reasoning about the algorithm. If any reasoning done offline by a person with deeper intuition about the algorithm can be captured into constraints, it will save the solver from trying to derive that reasoning independently (if even it could). In the next section, direct analysis is described, since it is at the core of the method with Setup, Takedown and the result of the iterative analysis phase all being managed through direct analysis.

Having shown that an iterative algorithm can be broken down into separate pieces for analysis as direct calculations, and noting that a large direct calculation can be partitioned into more manageable pieces according to the same reasoning, we discuss next in more detail this direct analysis depicted in the right half of FIG. 16. The constraints for the base formulation come from the dataflow and its precision counterpart involving δ terms, formed as discussed above. This base formulation includes constraints for known bounds on input error and requirements on output error. This feeds into the core of the analysis which is the error search across the δ terms (discussed immediately below), which eventually produces range limits (as per Kinsman reference) for each intermediate, as well as for each δ term indicating quantization points within the dataflow which map directly onto custom representations. Table 19 shows robust conversions from ranges to bit-widths in terms of I (integer), E (exponent), F (fraction), M (mantissa) and s (sign) bits. In each case, the sign bit is 0 if $x_L$ and $x_H$ have the same sign, or 1 otherwise. Note that vector-magnitude bounds (as per the Kinsman reference) must first be converted to element-wise bounds before applying the rules in the table, using $\|x\|_2 < X \rightarrow -X \leq [x]_i < X$, and $\|\delta x\|_2 < X \rightarrow -X/\sqrt{N} \leq [\delta x]_i < X/\sqrt{N}$ for vectors with N elements.

TABLE 19

| Type | Constraints | Bits Required | Total |
|---|---|---|---|
| Fixed | $x_L < \bar{x} < x_H$<br>$\delta x_L < \delta x < \delta x_H$ | $I = \lceil \log_2[\max(\|x_L\|, \|x_H\|) + 1] \rceil$<br>$F = -\lfloor \log_2[\min(\|\delta x_L\|, \|\delta x_H\|)] \rfloor$ | $s + I + F$ |
| Float | $x_L < \bar{x} < x_H$<br>$\delta x \leq \max\left(\begin{array}{c}\text{slope}_x \|x\|,\\ \text{knee}_x\end{array}\right)$ | $M = -\lfloor \log_2(\text{slope}_x) \rfloor$<br>$E_H = \lceil \log_2[\max(\|x_L\|, \|x_H\|)] \rceil$<br>$E_L = \lfloor \log_2 \text{knee}_x \rfloor + M - 1$<br>$E = \lceil \log_2(E_H - E_L + 1) \rceil$ | $s + M + E$ |

With the base constraints (set up as above) forming an instance for the solver, solver execution becomes the means of evaluating a chosen quantization scheme. The error search that forms the core of the direct analysis utilizes this error bound engine by plugging into the knee and slope values for each δ constraint. Selections for knee and slope are made based on feedback from both the hardware cost model and the error bounds obtained from the solver. In this way, the quantization choices made as the search runs are meant to evolve toward a quantization scheme which satisfies the desired end error/cost trade-off.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

It will now be apparent that the steps of the above methods can be varied and likewise that various specific design choices can be made relative to how to implement various steps in the methods.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM), fixed disks or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C"), an object-oriented language (e.g. "C++"), a functional language, a hardware description language (e.g. Verilog HDL), a symbolic design entry environment (e.g. MATLAB Simulink), or a combination of different languages. Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A portion of the disclosure of this document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The references in the following list are hereby incorporated by reference in their entirety:

[1] A. B. Kinsman and N. Nicolici. Computational bit-width allocation for operations in vector calculus. In *Proc. IEEE International Conference on Computer Design (ICCD)*, pages 433-438, 2009.

[2] A. B. Kinsman and N. Nicolici. Finite precision bit-width allocation using SAT-modulo theory. In *Proc. IEEE/ACM Design, Automation and Test in Europe (DATE)*, pages 1106-1111, 2009.

[3] G. Arfken. *Mathematical Methods for Physicists, 3rd Edition*. Orlando, Fla.: Academic Press, 1985.

[4] P. Belanovic and M. Rupp. Automated Floating-point to Fixed-point Conversion with the Fixify Environment. In *Proc. International Workshop on Rapid System Prototyping*, pages 172-178, 2005.

[5] S. Boyd and L. Vandenberghe. *Convex Optimization*. Cambridge University Press, 2004.

[6] R. L. Burden and J. D. Faires. *Numerical Analysis, 7th Edition*. Brooks Cole, 2000.

[7] C. Fang, R. Rutenbar, and T. Chen. Fast, Accurate Static Analysis for Fixed-point Finite-precision Effects in DSP Designs. In *Proc. International Conference on Computer Aided Design (ICCAD)*, pages 275-282, 2003.

[8] M. Franzle and C. Herde. HySAT: An Efficient Proof Engine for Bounded Model Checking of Hybrid Systems. *Formal Methods in System Design*, 30(3):178-198, June 2007.

[9] A. Gaffar, O. Mencer, W. L. P. Cheung, and N. Shirazi. Floating-point Bitwidth Analysis via Automatic Differentiation. In *Proc. IEEE International Conference on Field-Programmable Technology (FPT)*, pages 158-165, 2002.

[10] A. Gaffar, O. Mencer, and W. Luk. Unifying Bit-width Optimisation for Fixed-point and Floating-point Designs. In *Proc. IEEE Symposium on Field-Programmable Custom Computing Machines (FCCM)*, pages 79-88, 2004.

[11] D. Goldberg. What every computer scientist should know about floating point arithmetic. *ACM Computing Surveys*, 23(1):5-48, 1991.

[12] G. H. Golub and C. F. V. Loan. *Matrix Computations, 3rd Edition*. John Hopkins University Press, 1996.

[13] IEEE. IEEE Standard for Floating-Point Arithmetic. *IEEE Std 754-2008*, pages 1-58, 29 2008.

[14] V. Istratescu. *Fixed Point Theory: An Introduction*. Springer, 1981.

[15] J. Cong and K. Gururaj and B. Liu and C. Liu and Z. Zhang and S. Zhou and Y. Zou. Evaluation of Static Analysis Techniques for Fixed-Point Precision Optimization. In *Proc. International Symposium on Field-Programmable Custom Computing Machines*, pages 231-234, April 2009.

[16] A. Kinsman and N. Nicolici. Bit-width allocation for hardware accelerators for scientific computing using SAT-modulo theory. *IEEE Transactions on Computer-Aided Design of Integrated Circuits and Systems*, 29(3):405-413, March 2010.

[17] D.-U. Lee, A. Gaffar, R. Cheung, O. Mencer, W. Luk, and G. Constantinides. Accuracy-Guaranteed Bit-Width Optimization. *IEEE Transactions on Computer-Aided Design*, 25(10):1990-2000, October 2006.

[18] J. Lopez, C. Carreras, and O. Nieto-Taladriz. Improved Interval-Based Characterization of Fixed-Point LTI Systems With Feedback Loops. *IEEE Transactions on Computer Aided Design*, 26(11):1923-1933, November 2007.

[19] R. Mafi, S. Sirouspour, B. Moody, B. Mandavikhah, K. Elizeh, A. Kinsman, N. Nicolici, M. Fotoohi, and D. Madill. Hardware-based Parallel Computing for Real-time Haptic Rendering of Deformable Objects. In *Proc. of the IEEE International Conference on Intelligent Robots and Systems (IROS)*, pages 4187-4187, 2008.

[20] A. Mallik, D. Sinha, P. Banerjee, and H. Zhou. Low-Power Optimization by Smart Bit-Width Allocation in a SystemC-Based ASIC Design Environment. *IEEE Transactions on Computer-Aided Design*, pages 447-455, March 2007.

[21] R. Moore. Interval Analysis. Prentice Hall, 1966.

[22] W. Osborne, R. Cheung, J. Coutinho, W. Luk, and O. Mencer. Automatic Accuracy-Guaranteed Bit-Width Optimization for Fixed and Floating-Point Systems. In Proc. International Conference on Field Programmable Logic and Applications (FPL), pages 617-620, 2007.

[23] K. Radecka and Z. Zilic. Arithmetic transforms for compositions of sequential and imprecise datapaths. *IEEE Transactions on Computer-Aided Design of Integrated Circuits and Systems*, 25(7):1382-1391, July 2006.

[24] L. M. C. Ruey-Yuan Han. Fast fourier transform correlation tracking algorithm with background correction. U.S. Pat. No. 6,970,577, November 2005.

[25] K. Sano, T. Iizuka, and S. Yamamoto. Systolic Architecture for Computational Fluid Dynamics on FPGAs. In Proc. International Symposium on Field-Programmable Custom Computing Machines, pages 107-116, 2007.

[26] R. Scrofano, M. Gokhale, F. Trouw, and V. Prasanna. Accelerating Molecular Dynamics Simulations with Reconfigurable Computers. *IEEE Transactions on Parallel and Distributed Systems*, 19(6):764-778, June 2008.

[27] C. Shi and R. Brodersen. An Automated Floating-point to Fixed-point Conversion Methodology. In *Proc. International Conference on Acoustics, Speech, and Signal Processing (ICASSP)*, pages 529-532, 2003.

[28] J. Stolfi and L. de Figueiredo. Self-Validated Numerical Methods and Applications. In *Brazilian Mathematics Colloquium Monograph*, 1997.

[29] T. Todman, G. Constantinides, S. Wilton, O. Mencer, W. Luk, and P. Cheung. Reconfigurable Computing: Architectures and Design Methods. *IEE Proceedings—Computers and Digital Techniques*, pages 193-207, March 2005.

[30] University of Oldenburg. HySAT Download. http://hysat.informatik.uni-oldenburg.de/26273.html.

Having thus described the invention, what is claimed as new and secured by Letters Patent is:

1. A method for improving and validating memory and arithmetic resource allocation in computing devices when performing computing resource intensive computations, the method comprising:
   a) determining, by a processor, a type of computation to be performed;
   b) determining, by said processor, variables to be used in said computation;
   c) determining, by said processor, constraints for said computation;
   d) processing, by said processor, said variables and said constraints to either validate at least one bit-width for said variables or to generate at least one suitable bit-width to be used for said variables, said bit-width being a number of bits to be allocated for said variables;
   e) allocating, by said processor, resources for said computation based on said at least one bit-width in step d).

2. A method according to claim 1 wherein in the event said computation is a vector computation, step d) comprises
   d1) replacing vector operations in said computation with bounding operations which bound vector magnitudes according to a table as follows:

| Name | Vector Operation | Magnitude Model |
|---|---|---|
| Dot Product | $x \cdot y$ | $\|x\|\|y\|\cos(\theta_{xy})$ |
| Addition | $x + y$ | $\sqrt{\|x\|^2 + \|y\|^2 + 2x \cdot y}$ |
| Subtraction | $x - y$ | $\sqrt{\|x\|^2 + \|y\|^2 - 2x \cdot y}$ |
| Matrix Multiplication | $Ax$ | $\sigma\|x\|$ $\|\sigma_A^{min}\| \leq \sigma \leq \|\sigma_A^{max}\|$ |
| Pointwise Product | $x \circ y$ | $\epsilon\|x\|\|y\|$ $0 \leq \epsilon \leq 1$ | d2) partitioning said bounding operations to obtain first bounded operations
   d3) determining numerical bounds for said first bounded operations to obtain first numerical bounds
   d4) partitioning said bounded operations in a partitioning manner different from step d2) to obtain second bounded operations
   d5) determining numerical bounds for said second bounded operations to obtain second numerical bounds
   d6) comparing said first numerical bounds with said second numerical bounds to obtain a numerical bound gain
   d7) successively repeating steps d2)-d6) until said numerical bound gain is less than a given threshold or until a size of either said first bounded operations or said second bounded operations exceed a predetermined size threshold
   d8) determining a bit-width of said second numerical bounds
   d9) determining that said bit-width of said second numerical bounds is one of said at least one suitable bit-width.

3. A method according to claim 1 wherein in the event said computation involves precision bounds on at least one of said variables, step d) comprises:
   d1) augmenting operations in said computation with precision operations to bound error in said at least one of said variables according to a table as follows:

| Operator | Infinite Precision (Expression) | Finite Precision (Constraint) |
|---|---|---|
| Addition | $z = x + y$ | $\Delta z = \Delta x + \Delta y + \delta z$ |
| Subtraction | $z = x - y$ | $\Delta z = \Delta x - \Delta y + \delta z$ |
| Multiplication | $z = xy$ | $\Delta z = x\Delta y + y\Delta x + \Delta x \Delta y = \delta z$ |
| Division | $z = x/y$ | $\Delta z = \frac{\Delta x - z\Delta y}{y + \Delta y} + \delta z$ |
| Square root | $z = \sqrt{x}$ | $(\Delta z)^2 + 2(z - \delta z)\Delta z = \Delta x - (\delta z)^2 + 2z\delta z$ |
| Vector inner product | $z = x^T y$ | $\Delta z = x^T(\Delta y) + (\Delta x)^T y + (\Delta x)^T(\Delta y) + \delta z$ |
| Matrix-vector product | $z = Ax$ | $\Delta z = A(\Delta x) + (\Delta A)x + (\Delta A)(\Delta x) + \delta z$ | d2) determining bit-widths for said at least one of said variables based on range limits for said at least one of said variables according to a table as follows:

| Type | Constraints | Bits Required | Total |
|---|---|---|---|
| Fixed | $x_L < \bar{x} < x_H$ $\delta x_L < \delta x < \delta x_H$ | $I = \lceil \log_2[\max(\|x_L\|, \|x_H\|) + 1]\rceil$ $F = -\lfloor \log_2[\min(\|\delta x_L\|, \|\delta x_H\|)]\rfloor$ | $s + I + F$ |
| Float | $x_L < \bar{x} < x_H$ $\delta x \leq \max(slope_x\|x\|, knee_x)$ | $M = -\lfloor \log_2(slope_x)\rfloor$ $E_H = \lceil \log_2[\max(\|x_L\|, \|x_H\|)]\rceil$ $E_L = \lfloor \log_2 knee_x\rfloor + M - 1$ $E = \lceil \log_2(E_H - E_L + 1)\rceil$ | $s + M + E$ |

4. A method according to claim 1 wherein in the event said computation requires at least one intermediate variable with a predetermined upper bound value and a predetermined lower bound value, step d) comprises, for each of said at least one intermediate variable,
   d1) determining constraints for each variable in said computation
   d2) assigning said predetermined upper bound value to a temporary upper bound and assigning said predetermined lower bound value to a temporary lower bound
   d3) determining if all of said constraints can be satisfied using said temporary upper bound and said temporary lower bound
   d4) in the event said constraints can be satisfied using said temporary upper bound and said temporary lower bound, adjusting said temporary upper bound to a value equal to halfway between said temporary upper bound and said temporary lower bound
   d5) in the event said constraints cannot be satisfied using said temporary upper bound and said temporary lower bound, adjusting said temporary lower bound to a value equal to halfway between said temporary upper bound and said temporary lower bound
   d6) repeating steps d3)-d5) until an interval between said temporary upper bound and said temporary lower bound is less than a predetermined threshold value
   d7) assigning said temporary lower bound to an improved lower bound and assigning said predetermined upper bound to said temporary upper bound
   d8) determining if all of said constraints can be satisfied using said temporary upper bound and said temporary lower bound d9) in the event said constraints can be satisfied using said temporary upper bound and said temporary lower bound, adjusting said temporary lower bound to a value equal to halfway between said temporary upper bound and said temporary lower bound
d10) in the event said constraints cannot be satisfied using said temporary upper bound and said temporary lower bound, adjusting said temporary upper bound to a value equal to halfway between said temporary upper bound and said temporary lower bound
d11) repeating steps d8)-d10) until an interval between said temporary upper bound and said temporary lower bound is less than said predetermined threshold value
d12) assigning said temporary upper bound to an improved upper bound
d13) determining bit-widths of said improved upper bound and said improved lower bound
d14) determining that a larger bit-width of either said improved upper bound or said improved lower bound is one of said at least one suitable bit-width.

5. Non-transitory computer readable media having encoded thereon non-transitory instructions for executing a method for improving and validating memory and arithmetic resource allocation in computing devices when performing computing resource intensive computations, the method comprising:
   a) determining, by a processor, a type of computation to be performed;
   b) determining, by said processor, variables to be used in said computation;
   c) determining, by said processor, constraints for said computation;
   d) processing, by said processor, said variables and said constraints to either validate at least one bit-width for said variables or to generate at least one suitable bit-width to be used for said variables, said bit-width being a number of bits to be allocated for said variables;
   e) allocating, by said processor, resources for said computation based on said at least one bit-width in step d).

* * * * *